US012250644B2

(12) United States Patent
Lee

(10) Patent No.: US 12,250,644 B2
(45) Date of Patent: Mar. 11, 2025

(54) ELECTRONIC DEVICE FOR SUPPORTING DUAL CONNECTIVITY, AND METHOD FOR CONTROLLING SAME

(71) Applicant: LG ELECTRONICS INC., Seoul (KR)

(72) Inventor: Uncheol Lee, Seoul (KR)

(73) Assignee: LG ELECTRONICS INC., Seoul (KR)

(*) Notice: Subject to any disclaimer, the term of this patent is extended or adjusted under 35 U.S.C. 154(b) by 346 days.

(21) Appl. No.: 17/757,799

(22) PCT Filed: Jan. 29, 2020

(86) PCT No.: PCT/KR2020/001325
§ 371 (c)(1),
(2) Date: Jun. 21, 2022

(87) PCT Pub. No.: WO2021/153813
PCT Pub. Date: Aug. 5, 2021

(65) Prior Publication Data
US 2022/0361116 A1 Nov. 10, 2022

(51) Int. Cl.
H04W 52/34 (2009.01)
H04W 52/14 (2009.01)
(Continued)

(52) U.S. Cl.
CPC ....... H04W 52/346 (2013.01); H04W 52/146 (2013.01); H04W 52/367 (2013.01);
(Continued)

(58) Field of Classification Search
CPC ............. H04W 52/346; H04W 52/146; H04W 52/367; H04W 52/38; H04W 52/52;
(Continued)

(56) References Cited

U.S. PATENT DOCUMENTS

2010/0279621 A1 11/2010 Brown et al.
2016/0088534 A1* 3/2016 Axmon ................. H04L 5/0055
370/252
(Continued)

FOREIGN PATENT DOCUMENTS

KR 2011-0095906 8/2011
WO 2019-208906 10/2019

OTHER PUBLICATIONS

PCT International Application No. PCT/KR2020/001325, International Search Report dated Oct. 26, 2020, 4 pages.
(Continued)

Primary Examiner — Angelica Perez
(74) Attorney, Agent, or Firm — LEE, HONG, DEGERMAN, KANG & WAIMEY

(57) ABSTRACT

The present invention relates to an electronic device, comprising a modem which: when simultaneously connected to a master cell group according to a first communication mode and a secondary cell group according to a second communication mode, if a transmission power of a first uplink signal transmitted to the master cell group is greater than or equal to a preset maximum transmission power, controls a plurality of power amplification units such that transmission of a second uplink signal to be transmitted to the secondary (Continued)

cell group is deferred; and, if the transmission of the second uplink signal remains deferred for a preset time period, stops the transmission of the first uplink signal for a certain period of time and transmits the second uplink signal, thereby maintaining connectivity to the secondary cell group even when the transmission of the second uplink signal is deferred.

11 Claims, 19 Drawing Sheets

(51) Int. Cl.
  *H04W 52/36* (2009.01)
  *H04W 52/38* (2009.01)
  *H04W 52/52* (2009.01)
  *H04W 76/16* (2018.01)
  *H04W 76/25* (2018.01)
  *H04W 88/06* (2009.01)
(52) U.S. Cl.
  CPC ........... *H04W 52/38* (2013.01); *H04W 52/52* (2013.01); *H04W 76/16* (2018.02); *H04W 76/25* (2018.02); *H04W 88/06* (2013.01)

(58) Field of Classification Search
  CPC ..... H04W 76/16; H04W 76/25; H04W 52/16; H04W 52/34; H04W 76/15; H04W 88/02
  See application file for complete search history.

(56) References Cited

U.S. PATENT DOCUMENTS

| 2016/0128004 | A1* | 5/2016 | Lee | H04W 52/367 |
| | | | | 370/311 |
| 2023/0094321 | A1* | 3/2023 | Okamura | H04W 52/42 |
| | | | | 375/267 |

OTHER PUBLICATIONS

Park, "The Strategic Opinions for Promoting the Fourth Industry Revolution through the Supply of 5G Additional Frequency," Electronics and Telecommunications Trends, vol. 34, No. 6, Dec. 2019, 17 pages.
LG Electronics Inc., "Management of UE Transmit Power in Dual Connectivity," R2-134048, 3GPP TSG-RAN WG2 Meeting #84, Nov. 2013, 4 pages.

* cited by examiner

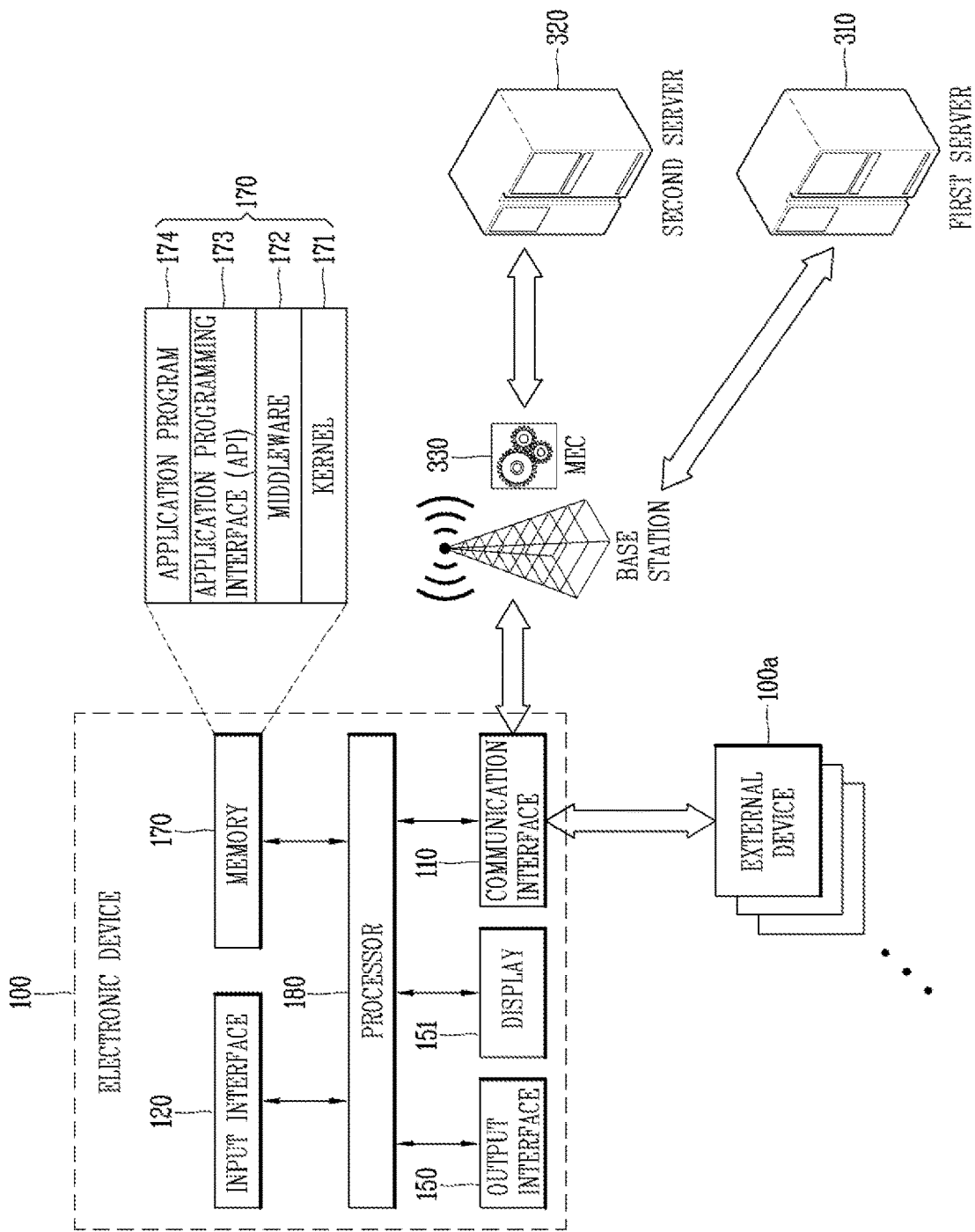

FIG. 7B

| SUBCARRIER SPACING: $f_o \times 2^\mu$, $f_o$ = 15kHz AND SCALING VALUE $2^\mu, \in \{-2, 0, 1, 2,..., 5\}$ | | | | | | | |
|---|---|---|---|---|---|---|---|
| $\mu$ | -2 | 0 | 1 | 2 | 3 | 4 | 5 |
| SUBCARRIER SPACING [kHz] | 3.75 | 15 | 30 | 60 | 120 | 240 | 480 |
| LENGTH OF OFDM SYMBOL [$\mu s$] | 266.67 | 66.67 | 33.33 | 16.67 | 8.333 | 4.17 | 2.08 |

15kHz 1 SLOT(14 SYMBOLS) : 1ms SUBFRAME

| 0 | 1 | 2 | 3 | 4 | 5 | 6 | 7 | 8 | 9 | 10 | 11 | 12 | 13 |

| 0 | 1 | 2 | 3 | 4 | 5 | 6 | 7 | 8 | 9 | 10 | 11 | 12 | 13 | 30kHz 1 SLOT(14 SYMBOLS) : 0.5ms

| 0 | 1 | 15kHz 1 SLOT(2 SYMBOLS) : 0.2ms

| 0 | 1 | 2 | 3 | 30kHz MINI SLOT(4 SYMBOLS) : 0.2ms

| 0 | 1 | 2 | 3 | 4 | 5 | 6 | 60kHz MINI SLOT(7 SYMBOLS) : 0.125ms

| UPLINK-DOWNLINK CONFIGURATION | DOWNLINK-TO-UPLINK SWITCH-POINT PERIODICITY | SUBFRAME NUMBER | | | | | | | | | |
|---|---|---|---|---|---|---|---|---|---|---|---|
| | | 0 | 1 | 2 | 3 | 4 | 5 | 6 | 7 | 8 | 9 |
| 0 | 5ms | D | S | U | U | U | D | S | U | U | U |
| 1 | 5ms | D | S | U | U | U | D | S | U | U | U |
| 2 | 5ms | D | S | U | U | U | D | S | U | U | U |
| 3 | 10ms | D | S | U | U | U | U | D | S | U | U |
| 4 | 10ms | D | S | U | U | U | U | D | S | U | U |
| 5 | 10ms | D | S | U | U | U | U | D | S | U | U |
| 6 | 5ms | D | S | U | U | U | D | S | U | U | U |

(a)

(b)

ELECTRONIC DEVICE FOR SUPPORTING DUAL CONNECTIVITY, AND METHOD FOR CONTROLLING SAME

CROSS-REFERENCE TO RELATED APPLICATIONS

This application is the National Stage filing under 35 U.S.C. 371 of International Application No. PCT/KR2020/001325, filed on Jan. 29, 2020, the contents of which is hereby incorporated by reference herein in its entirety.

TECHNICAL FIELD

The present disclosure relates to an electronic device that provides dual connectivity (DC) to heterogeneous networks according to different communication methods.

BACKGROUND ART

Recently, various electronic devices including mobile terminals can use services through 4G networks and 5G networks using not only long term evolution (LTE) communication technology but also new radio (NR; 5G) communication technology.

In the case of an electronic device that can support 4G communication and 5G communication at the same time, the dual connectivity (DC) function that allows connection to a 4G network and a 5G network at the same time by primarily accessing the 4G network and secondarily accessing the 5G network. Here, the 4G network may refer to a network in which signals according to the 4G communication method (hereinafter, 4G signals) are exchanged, and the 5G network may refer to a network in which signals according to the 5G communication method (hereinafter, 5G signals) are exchanged.

When the electronic device is simultaneously connected to a 4G network and a 5G network, typically, one network becomes a master and the other network becomes a secondary. For example, when an electronic device is connected to a 4G network first and is assigned, for 5G communication, a part of a bearer formed with a base station of the 4G network, the 4G network may become a master and the 5G network may become a secondary. In this case, 4G base stations may be referred to as a master cell group (MCG), and 5G base stations may be referred to as a secondary cell group (SCG). Also, when an electronic device is simultaneously connected to a 4G network and a 5G network, the transmission power of the electronic device may be calculated by summing the power for the 4G network (LTE signal transmission power) and the power for the 5G network (NR signal transmission power).

Meanwhile, as the danger of electromagnetic waves to the human body is known, current electronic devices tend to have limited maximum transmission power in order to reduce the harm of electromagnetic waves. To this end, a network connected to an electronic device provides the maximum transmission power, and the electronic device limits the amplification gain of a power amplifier (PA) according to the maximum transmission power provided by the network. Thus, it is possible to prevent the generation of electromagnetic waves that can harm the human body.

In this case, when dual connection to the 4G network and the 5G network is established as described above, transmission power for LTE signals and transmission power for NR signals are summed to determine the transmission power of the electronic device. Thus, according to the remaining transmission power excluding the transmission power corresponding to one of the communication methods, transmission power according to the other communication method may be determined because the maximum transmission power is limited. In this case, the transmission power of the SCG may be determined according to the remaining transmission power excluding the transmission power for the MCG (dynamic power sharing (DPS)).

Meanwhile, in the case of DPS, when transmission power required for communication with the MCG is equal to or greater than the currently set maximum transmission power, the transmission of signals to the SCG may be restricted. Also, when there is no transmission of signals to the SCG for a certain time or more, the SCG may cancel communication connection with the electronic device. Then, the electronic device may not be connected to the secondary network (e.g., the 5G network) even though the dual connection is established.

Meanwhile, even though the communication connection with the secondary network is terminated as described above, the electronic device is still dual-connected. Thus, the electronic device may attempt to transmit signals to the SCG when transmission power required by the MCG is reduced. In this case, since the communication connection to the secondary network is terminated, signal transmission fails. As the signal transmission fails, the electronic device may identify that the communication connection is terminated and connect to the second network for reconnection.

In this case, in order to connect to the secondary network, it is necessary for the mast node to configure the dual connection again, so that messages for the dual connection should be exchanged again. Also, since it is not possible to transmit or receive signals through the secondary network while the second network is terminated, data transmission may be delayed while the secondary network is being connected again.

DISCLOSURE OF INVENTION

Technical Problem

The present disclosure is directed to solving the above problems and other problems and provides an electronic device capable of preventing the connection of a secondary network from being canceled according to transmission power required by a master network while the electronic device is connected to both of the master network and the secondary network, and a control method of the electronic device.

Solution to Problem

To achieve the above or other objects, an electronic device according to an embodiment of the present disclosure includes a plurality of antennas including at least one first antenna configured to transmit or receive signals according to a first communication scheme and at least one second antenna configured to transmit or receive signals according to a second communication scheme, a plurality of power amplifiers connected to the plurality of antennas, and a modem configured to, when the electronic device is simultaneously connected to a master cell group (MCG) corresponding to the first communication scheme and a secondary cell group (SCG) corresponding to the second communication scheme, control the plurality of power amplifiers such that the transmission of a second uplink signal to be transmitted to the SCG is suspended when the transmission power of a first uplink signal transmitted to the MCG is greater than or equal to preset maximum transmission power and configured to, when the transmission of the second uplink signal is suspended for a preset time, stop the transmission of the first uplink signal for a certain time, transmit the second uplink signal, and maintain connection to the SCG even when the transmission of the second uplink signal is suspended.

In an embodiment, the preset maximum transmission power may be maximum transmission power that is set when the electronic device is simultaneously connected to the MCG and the SCG, and the preset maximum transmission power may be determined based on a power class corresponding to a combination of a frequency band of a base station according to the MCG connected to the electronic device and a frequency band of a base station according to the SCG connected to the electronic device.

In an embodiment, the preset time may be a time shorter than a time interval corresponding to a feedback period of the SCG.

In an embodiment, the certain time may be a time corresponding to a preset number of subframes, and the modem may transmit data corresponding to a control plane for the certain time.

In an embodiment, the certain time may be a time corresponding to a time length in which two subframes are transmitted.

In an embodiment, the MCG may be a cell group which corresponds to a 4G communication scheme, and the SCG may be a cell group in which signals corresponding to a 5G communication scheme are exchanged.

In an embodiment, the modem may determine whether a difference between the sum of the transmission power of the first uplink signal and the transmission power of the second uplink signal and the preset maximum transmission power is less than or equal to a certain level, and when the transmission power of the first uplink signal is greater than or equal to the preset maximum transmission power while the sum of the transmission power of the first uplink signal and the transmission power of the second uplink signal is greater than or equal to the preset maximum transmission power, the modem suspends the transmission of the second uplink signal.

In an embodiment, when the transmission timing of the first uplink signal and the transmission timing of the second uplink signal overlap, the modem may determine whether the difference between the sum of the transmission power of the first uplink signal and the transmission power of the second uplink signal and the preset maximum transmission power is less than or equal to the certain level.

To achieve the above or other objects, a control method of an electronic device according to an embodiment of the present disclosure includes a first operation of, when the electronic device is simultaneously connected to a master cell group (MCG) corresponding to a first communication scheme and a secondary cell group (SCG) corresponding to a second communication scheme, detecting whether the transmission power of a first uplink signal transmitted to the MCG is greater than or equal to preset maximum transmission power, a second operation of, when the detection result of the first operation is that the transmission power of the first uplink signal is greater than or equal to the preset maximum transmission power, stopping the transmission of a second uplink signal to be transmitted to the SCG, a third operation of counting time during which the transmission of the second uplink signal is suspended, a fourth operation of, when the time during which the transmission of the second uplink signal is suspended reaches a preset time, stopping the transmission of the first uplink signal for a certain time, and a fifth operation of resuming the transmission of the second uplink signal for the certain time during which the transmission of the first uplink signal is stopped, and stopping the transmission of the second uplink signal and then resuming the transmission of the first uplink signal after the certain time.

In an embodiment, the first operation includes a first_1 operation of detecting whether the transmission timing of the first uplink signal and the transmission timing of the second uplink signal overlap, a first_2 operation of comparing the sum of the transmission power of the first uplink signal and the transmission power of the second uplink signal to preset maximum transmission power when the transmission timing of the first uplink signal and the transmission timing of the second uplink signal overlap, and a first_3 operation of comparing the transmission power of the first uplink signal to the present maximum transmission power when the comparison result of the first_2 operation is that the sum of the transmission power of the first uplink signal and the transmission power of the second uplink signal is greater than or equal to the preset maximum transmission power.

In an embodiment, the preset time may be a time shorter than a time interval corresponding to a feedback period of the SCG.

In an embodiment, the certain time may be a time corresponding to a preset number of subframes, and the fifth operation may be an operation of transmitting data corresponding to a control plane for the certain time as the second uplink signal.

Advantageous Effects of Invention

According to an embodiment of the present disclosure, while an electronic device is connected to both of a master network and a secondary network, when the time during preset conditions (uplink transmission timing matching, the sum of transmission power being greater than or equal to maximum transmission power, the transmission power of an uplink signal of a master cell group being greater than or equal to maximum transmission power) are satisfied is greater than or equal to a preset time, it is possible to prevent the connection of the secondary network from being canceled by suspending the transmission of the uplink signal in a master cell group for a certain time and transmitting an uplink signal in a secondary cell group for the corresponding time.

Accordingly, it is possible to save network resources because messages for reconnection to a secondary network are not exchanged, and it is possible to prevent delay in data transmission using the secondary network because time is not required for reconnection to the secondary network.

BRIEF DESCRIPTION OF DRAWINGS

FIGS. 1A and 1B are conceptual views showing an interface between an electronic device and an external device or a server associated with an embodiment of the present disclosure.

FIGS. 7A and 7B are conceptual views for explaining a structure of a frame according to a 5G communication scheme (NR: New Radio).

MODE FOR THE INVENTION

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In describing the present disclosure, if a detailed explanation for a related known function or construction is considered to unnecessarily divert the gist of the present disclosure, such explanation has been omitted but would be understood by those skilled in the art. The accompanying drawings are used to help easily understand the technical idea of the present disclosure and it should be understood that the idea of the present disclosure is not limited by the accompanying drawings. The idea of the present disclosure should be construed to extend to any alterations, equivalents and substitutes besides the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the another element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Electronic devices described herein may include cellular phones, smart phones, laptop computers, digital broadcasting terminals, personal digital assistants (PDAs), portable multimedia players (PMPs), navigators, slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, digital signages, and the like.

Figure 1B:
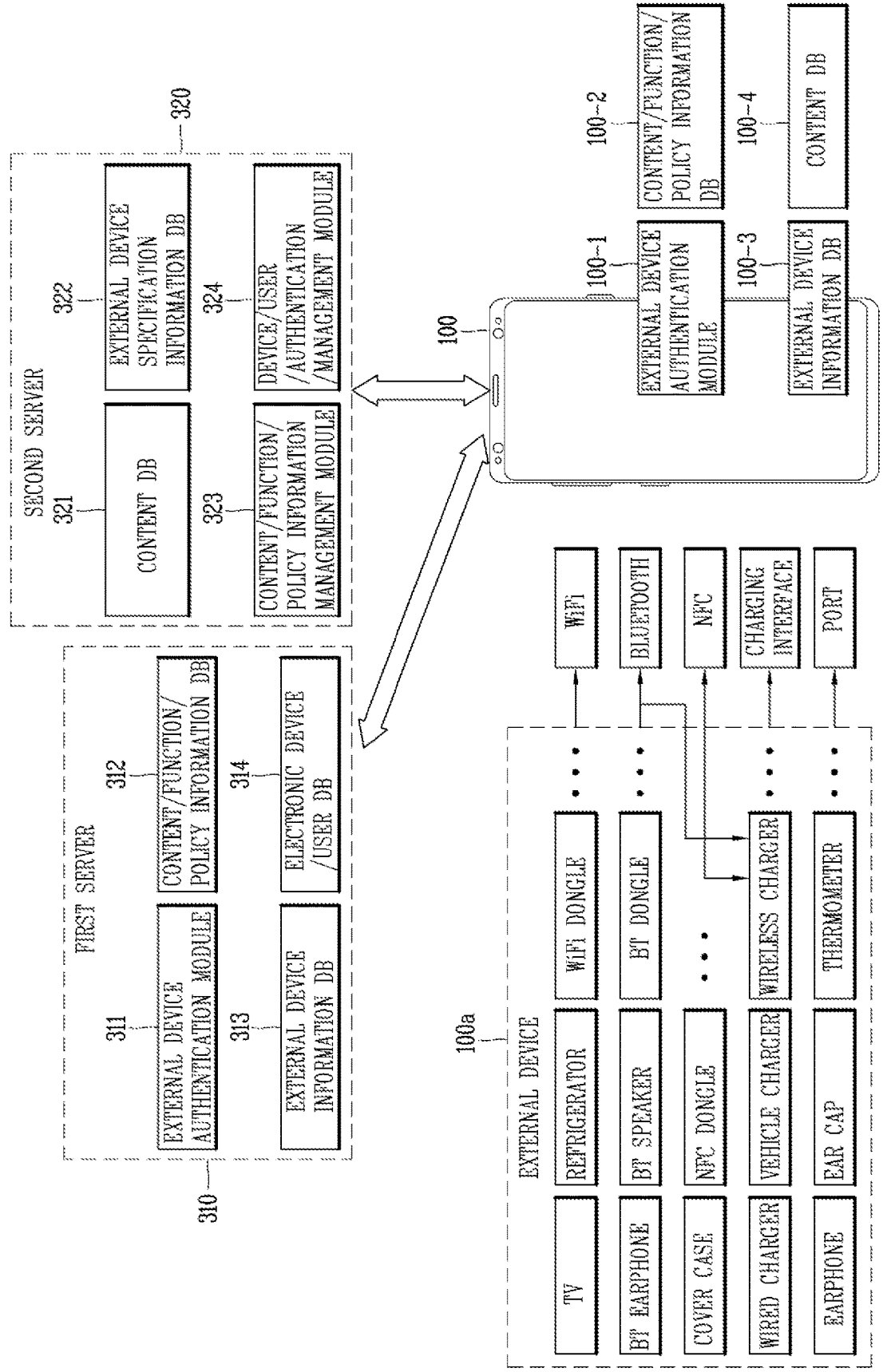

Referring to FIGS. 1A and 1B, FIG. 1A is a view illustrating a configuration for describing an electronic device in accordance with one implementation, and an interface between the electronic device and an external device or server. FIG. 1B is a view illustrating a detailed configuration in which the electronic device according to the one implementation is interfaced with the external device or the server.

Figure 2A:
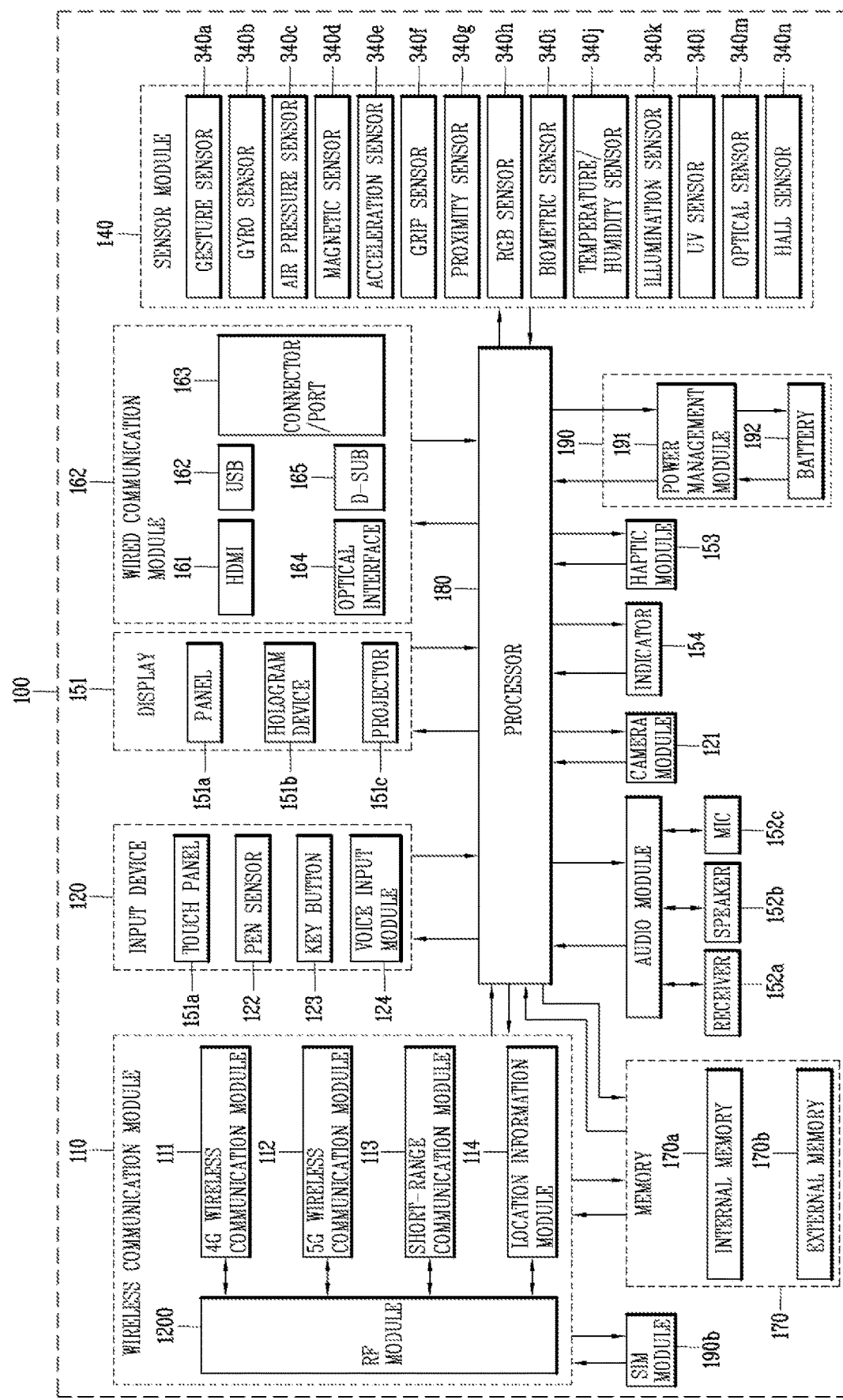
FIG. 2A is a block diagram for explaining a detailed configuration of an electronic device associated with an embodiment of the present disclosure.
Figure 2B:
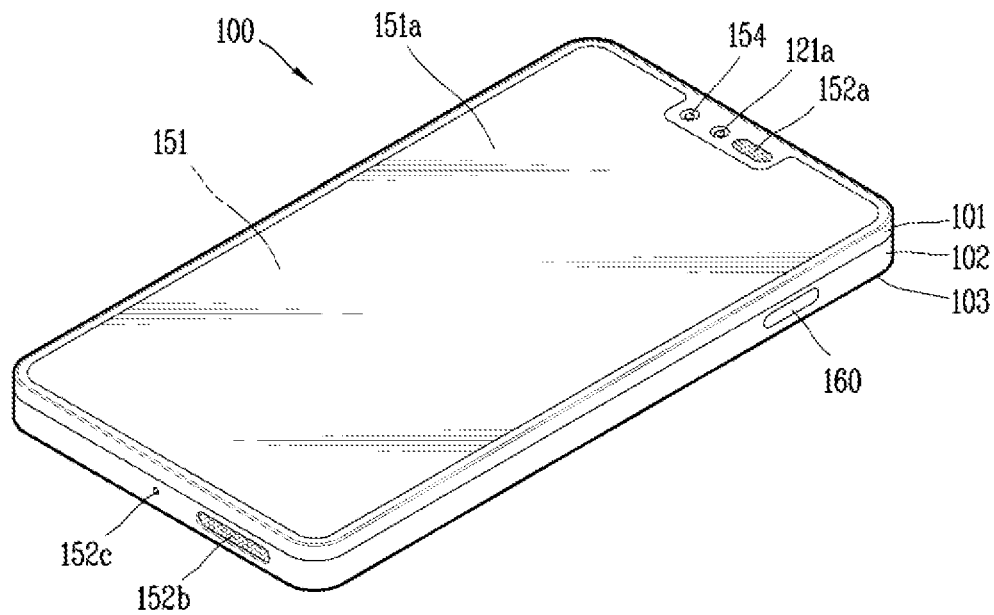
FIGS. 2B and 2C are perspective views in which an electronic device associated with an embodiment of the present disclosure is seen from different directions.
Figure 2C:
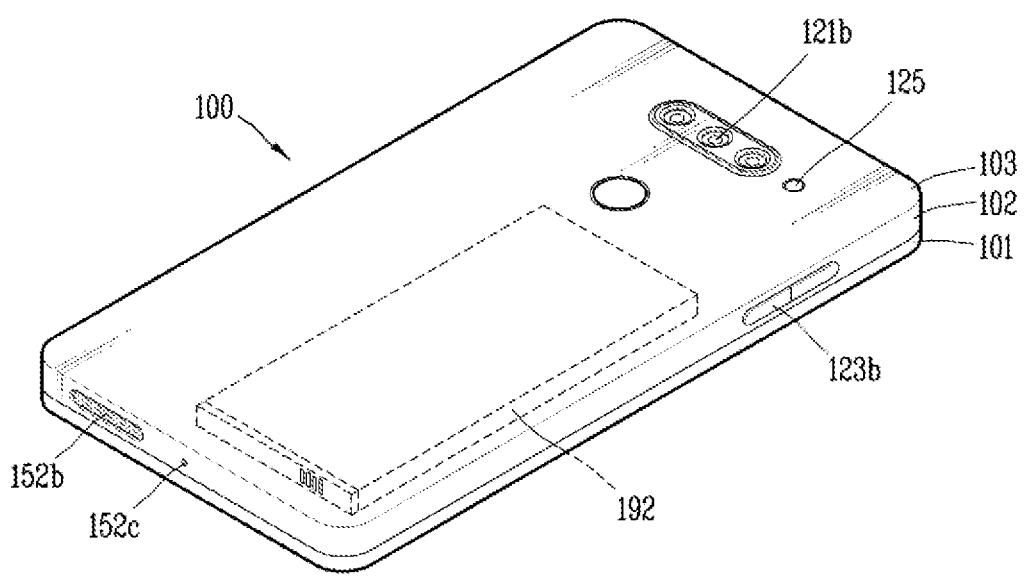

Meanwhile, referring to FIGS. 2A to 2C, FIG. 2A illustrates a detailed configuration of the electronic device of FIG. 1A. FIGS. 2B and 2C are conceptual views illustrating one example of the electronic device, viewed from different directions.

Referring to FIG. 1A, the electronic device 100 may include a communication interface 110, an input interface (or an input device) 120, an output interface (or an output device) 150, and a processor 180. Here, the communication interface 110 may refer to a wireless communication module 110. The electronic device 100 may further include a display 151 and a memory 170. It may be understood that implementing all of the illustrated components in FIG. 1A is not a requirement, and that greater or fewer components are alternatively implemented.

In more detail, among others, the wireless communication module 110 may typically include one or more modules which permit wireless communications between the electronic device 100 and a wireless communication system, communications between the electronic device 100 and another electronic device, or communications between the electronic device 100 and an external server. The wireless communication module 110 may typically include one or more modules which connect the electronic device 100 to one or more networks. Here, the one or more networks may be, for example, a 4G communication network and a 5G communication network.

Referring to FIGS. 1A and 2A, the wireless communication module 110 may include at least one of a 4G wireless communication module 111, a 5G wireless communication module 112, a short-range communication module 113, and a location information module 114. The 4G wireless communication module 111, the 5G wireless communication module 112, the short-range communication module 113, and the location information module 114 may be implemented as a baseband processor such as a modem. As one example, the 4G wireless communication module 111, the 5G wireless communication module 112, the short-range communication module 113, and the location information module 114 may be implemented as a transceiver circuit operating in an IF band and a baseband processor. Meanwhile, an RF module 1200 may be implemented as an RF transceiver circuit operating in an RF frequency band of each communication system. However, the present disclosure may not be limited thereto, but may be interpreted that each of the 4G wireless communication module 111, the 5G wireless communication module 112, the short-range communication module 113, and the location information module 114 includes an RF module.

The 4G wireless communication module 111 may perform transmission and reception of 4G signals with a 4G base station through a 4G mobile communication network. In this case, the 4G wireless communication module 111 may transmit at least one 4G transmission signal to the 4G base station. In addition, the 4G wireless communication module 111 may receive at least one 4G reception signal from the 4G base station. In this regard, Uplink (UL) Multi-input and Multi-output (MIMO) may be performed by a plurality of 4G transmission signals transmitted to the 4G base station. In addition, Downlink (DL) MIMO may be performed by a plurality of 4G reception signals received from the 4G base station.

The 5G wireless communication module 112 may perform transmission and reception of 5G signals with a 5G base station through a 5G mobile communication network. Here, the 4G base station and the 5G base station may have a Non-Stand-Alone (NSA) structure. For example, the 4G base station and the 5G base station may be a co-located structure in which the stations are disposed at the same location in a cell. Alternatively, the 5G base station may be disposed in a Stand-Alone (SA) structure at a separate location from the 4G base station.

The 5G wireless communication module 112 may perform transmission and reception of 5G signals with a 5G base station through a 5G mobile communication network. In this case, the 5G wireless communication module 112 may transmit at least one 5G transmission signal to the 5G base station. In addition, the 5G wireless communication module 112 may receive at least one 5G reception signal from the 5G base station.

In this instance, 5G and 4G networks may use the same frequency band, and this may be referred to as LTE re-farming. In some examples, a Sub 6 frequency band, which is a range of 6 GHz or less, may be used as the 5G frequency band.

On the other hand, a millimeter-wave (mmWave) range may be used as the 5G frequency band to perform wideband high-speed communication. When the mmWave band is used, the electronic device 100 may perform beamforming for communication coverage expansion with a base station.

On the other hand, regardless of the 5G frequency band, 5G communication systems can support a larger number of multi-input/multi-output (MIMO) to improve a transmission rate. In this instance, UL MIMO may be performed by a plurality of 5G transmission signals transmitted to a 5G base station. In addition, DL MIMO may be performed by a plurality of 5G reception signals received from the 5G base station.

On the other hand, the wireless communication module 110 may be in a Dual Connectivity (DC) state with the 4G base station and the 5G base station through the 4G wireless communication module 111 and the 5G wireless communication module 112. As such, the dual connectivity with the 4G base station and the 5G base station may be referred to as EUTRAN NR DC (EN-DC). Here, EUTRAN is an abbreviated form of "Evolved Universal Telecommunication Radio Access Network", and refers to a 4G wireless communication system. Also, NR is an abbreviated form of "New Radio" and refers to a 5G wireless communication system.

On the other hand, if the 4G base station and 5G base station are disposed in a co-located structure, throughput improvement can be achieved by inter-Carrier Aggregation (inter-CA). Accordingly, when the 4G base station and the 5G base station are disposed in the EN-DC state, the 4G reception signal and the 5G reception signal may be simultaneously received through the 4G wireless communication module 111 and the 5G wireless communication module 112.

The short-range communication module 113 is configured to facilitate short-range communications. Suitable technologies for implementing such short-range communications include Bluetooth, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general may support wireless communications between the electronic device 100 and a wireless communication system, communications between the electronic device 100 and another electronic device 100, or communications between the electronic device and a network where another electronic device 100 (or an external server) is located via wireless area networks. One example of the wireless area networks may be a wireless personal area network.

Short-range communication between electronic devices may be performed using the 4G wireless communication module 111 and the 5G wireless communication module 112. In one implementation, short-range communication may be performed between electronic devices in a device-to-device (D2D) manner without passing through a base station.

Meanwhile, for transmission rate improvement and communication system convergence, Carrier Aggregation (CA) may be carried out using at least one of the 4G wireless communication module 111 and the 5G wireless communication module 112 and a WiFi communication module. In this regard, 4G+WiFi CA may be performed using the 4G wireless communication module 111 and the Wi-Fi communication module 113. Or, 5G+WiFi CA may be performed using the 5G wireless communication module 112 and the Wi-Fi communication module 113.

The location information module 114 may be generally configured to detect, calculate, derive or otherwise identify a position (or current position) of the electronic device. As an example, the location information module 115 may include a Global Position System (GPS) module, a Wi-Fi module, or both. For example, when the electronic device uses the GPS module, the position of the electronic device may be acquired using a signal sent from a GPS satellite. As another example, when the electronic device uses the Wi-Fi module, the position of the electronic device may be acquired based on information related to a wireless access point (AP) which transmits or receives a wireless signal to or from the Wi-Fi module. If desired, the location information module 114 may alternatively or additionally function with any of the other modules of the wireless communication module 110 to obtain data related to the position of the electronic device. The location information module 114 may be a module used for acquiring the position (or the current position) and may not be limited to a module for directly calculating or acquiring the position of the electronic device.

Specifically, when the electronic device utilizes the 5G wireless communication module 112, the position of the electronic device may be acquired based on information related to a 5G base station which performs wireless signal transmission or reception with the 5G wireless communication module. In particular, since the 5G base station of the mmWave band is deployed in a small cell having a narrow coverage, it may be advantageous to acquire the position of the electronic device.

The input device 120 may include a pen sensor 1200, a key button 123, a voice input module 124, a touch panel 151*a*, and the like. On the other hand, the input device 120 may include a camera module 121 for inputting an image signal, a microphone 152*c* or an audio input module for inputting an audio signal, or a user input unit 123 (e.g., a touch key, a push key (or a mechanical key), etc.) for allowing a user to input information. Data (for example, audio, video, image, and the like) may be obtained by the input device 120 and may be analyzed and processed according to user commands.

The camera module 121 is a device capable of capturing still images and moving images. According to one embodiment, the camera module 121 may include one or more image sensors (e.g., a front sensor or a rear sensor), a lens, an image signal processor (ISP), or a flash (e.g., LED or lamp).

The sensor module 140 may typically be implemented using one or more sensors configured to sense internal information of the electronic device, the surrounding environment of the electronic device, user information, and the like. For example, the sensor module 140 includes at least one of a gesture sensor 340*a*, a gyro sensor 340*b*, an air pressure sensor 340*c*, a magnetic sensor 340*d*, an acceleration sensor 340*e*, a grip sensor 340*f*, and a proximity sensor 340*g*, a color sensor 340*h* (e.g., RGB (red, green, blue) sensor), a bio-sensor 340*i*, a temperature/humidity sensor 340*j*, an illuminance sensor 340*k*, an ultra violet (UV) sensor 340*l*, a light sensor 340*m*, and a hall sensor 340*n*. The sensor module 140 may also include at least one of a finger scan sensor, an ultrasonic sensor, an optical sensor (for example, camera 121), a microphone (see 152*c*), a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like). The electronic device disclosed herein may be configured to utilize information obtained from at least two of those sensors.

The output interface 150 may typically be configured to output various types of information, such as audio, video, tactile output, and the like. The output device 150 may be shown having at least one of a display 151, an audio module 152, a haptic module 153, and an indicator 154.

The display 151 may have an inter-layered structure or an integrated structure with a touch sensor in order to implement a touch screen. The touch screen may function as the user input unit 123 which provides an input interface between the electronic device 100 and the user and simultaneously provide an output interface between the electronic device 100 and a user. For example, the display 151 may be a liquid crystal display (LCD), a light emitting diode (LED) display, an organic light emitting diode (OLED) display, a microelectromechanical systems (MEMS) display, or an electronic paper display. For example, the display 151 may display various contents (e.g., text, images, videos, icons, and/or symbols, etc.). The display 151 may include a touch screen, and may receive, for example, a touch, gesture, proximity, or hovering input using an electronic pen or a part of the user's body.

Meanwhile, the display 151 may include a touch panel 151*a*, a hologram device 151*b*, and a projector 151*c* and/or a control circuit for controlling them. In this regard, the panel may be implemented to be flexible, transparent, or wearable. The panel may include a touch panel 151*a* and one or more modules. The hologram device 151*b* may show a stereoscopic image in the air by using interference of light. The projector 151*c* may display an image by projecting light on a screen. The screen may be located, for example, inside or outside the electronic device 100.

The audio module 152 may be configured to interwork with the receiver 152*a*, the speaker 152*b*, and the microphone 152*c*. Meanwhile, the haptic module 153 may convert an electrical signal into a mechanical vibration, and generate a vibration or a haptic effect (e.g., pressure, texture). The electronic device may include a mobile TV supporting device (e.g., a GPU) that may process media data as per, e.g., digital multimedia broadcasting (DMB), digital video broadcasting (DVB), or mediaFlo™ standards. The indicator 154 may indicate a particular state of the electronic device 100 or a part (e.g., the processor 310) of the electronic device, including, e.g., a booting state, a message state, or a recharging state.

The wired communication module 160 which may be implemented as an interface unit may serve as a passage with various types of external devices connected to the electronic device 100. The wired communication module 160 may include an HDMI 162, a USB 162, a connector/port 163, an optical interface 164, or a D-sub (D-subminiature) 165. Also, the wired communication module 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the electronic device 100 may perform assorted control functions associated with a connected external device, in response to the external device being connected to the wired communication module 160.

The memory 170 is typically implemented to store data to support various functions or features of the electronic device 100. For instance, the memory 170 may be configured to store application programs executed in the electronic device 100, data or instructions for operations of the electronic device 100, and the like. At least some of these application programs may be downloaded from an external server (e.g., a first server 310 or a second server 320) through wireless communication. Other application programs may be installed within the electronic device 100 at time of manufacturing or shipping, which is typically the case for basic functions of the electronic device 100 (for example, receiving a call, placing a call, receiving a message, sending a message, and the like). Application programs may be stored in the memory 170, installed in the electronic device 100, and executed by the processor 180 to perform an operation (or function) for the electronic device 100.

In this regard, the first server 310 may be referred to as an authentication server, and the second server 320 may be referred to as a content server. The first server 310 and/or the second server 320 may be interfaced with the electronic device through a base station. Meanwhile, a part of the second server 320 corresponding to the content server may be implemented as a mobile edge cloud (MEC) 330 in a base station unit. Accordingly, a distributed network may be implemented through the second server 320 implemented as the mobile edge cloud (MEC) 330, and content transmission delay may be shortened.

The memory 170 may include a volatile and/or nonvolatile memory. Also, the memory 170 may include an internal memory 170a and an external memory 170b. The memory 170 may store, for example, commands or data related to at least one of other components of the electronic device 100. According to one embodiment, the memory 170 may store software and/or a program 240. For example, the program 240 may include a kernel 171, middleware 172, an application programming interface (API) 173, an application program (or "application") 174, or the like. At least one of the kernel 171, the middleware 172, or the API 174 may be referred to as an operating system (OS).

The kernel 171 may control or manage system resources (e.g., the bus, the memory 170, or the processor 180) that are used for executing operations or functions implemented in other programs (e.g., the middleware 172, the API 173, or the application program 174). In addition, the kernel 171 may provide an interface to control or manage system resources by accessing individual components of the electronic device 100 in the middleware 172, the API 173, or the application program 174.

The middleware 172 may function as an intermediary so that the API 173 or the application program 174 communicates with the kernel 171 to exchange data. Also, the middleware 172 may process one or more task requests received from the application program 247 according to priorities. In one embodiment, the middleware 172 may give at least one of the application programs 174 a priority to use the system resources (e.g., the bus, the memory 170, or the processor 180) of the electronic device 100, and process one or more task requests. The API 173 is an interface for the application program 174 to control functions provided by the kernel 171 or the middleware 1723, for example, at least one for file control, window control, image processing, or text control. Interface or function, for example Command).

The controller 180 may typically function to control an overall operation of the electronic device 100, in addition to the operations associated with the application programs. The processor 180 may provide or process information or functions appropriate for a user by processing signals, data, information and the like, which are input or output by the foregoing components, or executing application programs stored in the memory 170. Furthermore, the processor 180 may control at least part of the components illustrated in FIGS. 1A and 2A, in order to execute the application programs stored in the memory 170. In addition, the processor 180 may combine at least two of the components included in the electronic device 100 to execute the application program.

The processor 180 may include one or more of a central processing unit (CPU), an application processor (AP), an image signal processor (ISP), a communication processor (CP), and a low power processor (e.g., sensor hub). For example, the processor 180 may execute a control of at least one of other components and/or an operation or data processing related to communication.

The power supply unit 190 may be configured to receive external power or provide internal power in order to supply appropriate power required for operating elements and components included in the electronic device 100, under the control of the processor 180. The power supply unit 190 may include a power management module 191 and a battery 192, and the battery 192 may be an embedded battery or a replaceable battery. The power management module 191 may include a power management integrated circuit (PMIC), a charging IC, or a battery or fuel gauge. The PMIC may have a wired and/or wireless recharging scheme. The wireless charging scheme may include, e.g., a magnetic resonance scheme, a magnetic induction scheme, or an electromagnetic wave based scheme, and an additional circuit, such as a coil loop, a resonance circuit, a rectifier, or the like may be added for wireless charging. The battery gauge may measure an amount of remaining power of the battery 396, and a voltage, a current, or a temperature while the battery 396 is being charged. The battery 396 may include, e.g., a rechargeable battery or a solar battery.

Each of the external device 100a, the first server 310, and the second server 320 may be the same or different type of device (e.g., external device or server) as or from the electronic device 100. According to an implementation, all or some of operations executed on the electronic device 100 may be executed on another or multiple other electronic devices (e.g., the external device 100a, the first server 310 and the second server 320). According to an implementation, when the electronic device 100 should perform a specific function or service automatically or at a request, the electronic device 100 may request another device (e.g., the external device 100a, the first server 310, and the second server 320) to perform at least some functions associated therewith, instead of executing the function or service on its own or additionally. The another electronic device (e.g., the external device 100a, the first server 310, and the second server 320) may execute the requested function or additional function and transfer a result of the execution to the electronic device 100. The electronic device 100 may provide the requested function or service by processing the received result as it is or additionally. To that end, a cloud computing, distributed computing, client-server computing, or mobile-edge cloud (MEC) technology may be used, for example.

At least some of the components may cooperatively operate to implement an operation, a control or a control method of the electronic device according to various implementations disclosed herein. Furthermore, the operation and control or the control method of the electronic device may be implemented in the electronic device by executing at least one application program stored in the memory 170.

Referring to FIGS. 1A and 1B, a wireless communication system may include an electronic device 100, at least one external device 100a, a first server 310, and a second server 320. The electronic device 100 may be functionally connected to at least one external device 100a, and may control contents or functions of the electronic device 100 based on information received from the at least one external device 100a. According to one embodiment of the present disclosure, the electronic device 100 may perform authentication to determine whether the at least one external device 100 includes or generates information following a predetermined rule using the servers 310, 320. Also, the electronic device 100 may display contents or control functions differently by controlling the electronic device 100 based on the authentication result. According to an embodiment of the present disclosure, the electronic device 100 may be connected to at least one external device 100a through a wired or wireless communication interface to receive or transmit information. For example, the electronic device 100 and the at least one external device 100a may receive and transmit information in a manner such as near field communication (NFC), a charger (e.g., universal serial bus (USB)-C)), an ear jack, BT (Bluetooth) or WiFi (wireless fidelity).

The electronic device 100 may include at least one of an external device authentication module 100-1, a content/function/policy information DB 100-2, an external device information DB 100-3, or a content DB 104. The at least one external device 100a, as an assistant apparatus associated with the electronic device 100, may be a device designed for various purposes, such as ease of use, increased appearance aesthetics, and enhanced usability of the electronic device 100. The at least one external device 100a may or may not be in physical contact with the electronic device 100. According to one implementation, the at least one external device 100a may be functionally connected to the electronic device 100 using a wired/wireless communication module to control information for controlling content or a function in the electronic device 100.

According to one embodiment, the at least one external device 100a may include an authentication module for encrypting/decrypting at least one of various pieces of information included in the external device information, or storing or managing it in a physical/virtual memory area that is not directly accessible from the outside. According to one embodiment, the at least one external device 100a may perform communication with the electronic device 100 or may provide information through communication between the external devices. According to one embodiment, the at least one external device 100a may be functionally connected to the server 410 or 320. In various embodiments, the at least one external device 100a may be various types of products such as a cover case, an NFC dongle, a car charger, an earphone, an ear cap (e.g., an accessory device mounted on a mobile phone audio connector), a thermometer, an electronic pen, a BT earphone, a BT speaker, a BT dongle, a TV, a refrigerator, and a WiFi dongle.

In this regard, for example, the external device 100a such as a wireless charger may supply power to the electronic device 100 through a charging interface such as a coil. In this case, control information may be exchanged between the external device 100a and the electronic device 100 through in-band communication through a charging interface such as a coil. Meanwhile, control information may be exchanged between the external device 100a and the electronic device 100 through out-of-band communication such as Bluetooth or NFC.

On the other hand, the first server 310 may include a server or a cloud device for a service associated with the at least one external device 100a, or a hub device for controlling a service in a smart home environment. The first server 310 may include at least one of an external device authentication module 311, a content/function/policy information DB 312, an external device information DB 313, and an electronic device/user DB 314. The first server 310 may be referred to as an authentication management server, an authentication server, or an authentication related server. The second server 320 may include a server or cloud device for providing a service or content, or a hub device for providing a service in a smart home environment. The second server 320 may include at least one of a content DB 321, an external device specification information DB 322, a content/function/policy information management module 323, and a device/user authentication/management module 324. The second server 130 may be referred to as a content management server, a content server, or a content related server.

Referring to FIGS. 2B and 2C, the electronic device 100 disclosed herein has a bar-type terminal body. However, the present disclosure may not be necessarily limited to this, and may be also applicable to various structures such as a watch type, a clip type, a glasses type, a folder type in which two or more bodies are coupled to each other in a relatively movable manner, a flip type, a slide type, a swing type, a swivel type, and the like. The description in association with a specific type of electronic device or on a specific type of electronic device will be also typically applied to another type of electronic device.

Here, the terminal body may be understood as a conception which indicates the electronic device 100 as at least one assembly.

The electronic device 100 may include a case (for example, a frame, a housing, a cover, etc.) constituting the appearance thereof. As illustrated in the drawing, the electronic device 100 may include a front case 101 and a rear case 102. Various electronic components may be incorporated into a space formed between the front case 101 and the rear case 102. At least one middle case may be additionally positioned between the front case 101 and the rear case 102.

A display 151 may be disposed on a front surface of the terminal body to output information. As illustrated, a window 151a of the display 151 may be mounted to the front case 101 so as to form the front surface of the terminal body together with the front case 101.

In some embodiments, electronic components may also be mounted to the rear case 102. Examples of those electronic components mounted to the rear case 102 may include a detachable battery, an identification module, a memory card and the like. Here, a rear cover 103 for covering the electronic components mounted may be detachably coupled to the rear case 102. Therefore, when the rear cover 103 is detached from the rear case 102, the electronic components mounted on the rear case 102 are exposed to the outside. Meanwhile, part of a side surface of the rear case 102 may be implemented to operate as a radiator.

As illustrated, when the rear cover 103 is coupled to the rear case 102, a side surface of the rear case 102 may partially be exposed. In some cases, upon the coupling, the rear case 102 may also be completely shielded by the rear cover 103. Meanwhile, the rear cover 103 may include an opening for externally exposing a camera 121b or an audio output module 152b.

The electronic device 100 may include a display 151, first and second audio output modules 152a, 152b, a proximity sensor 141, an illumination sensor 152, an optical output module 154, first and second cameras 121a, 121b, first and second manipulation units 123a, 123b, a microphone 152c, a wired communication module 160, and the like.

The display 151 may display (output) information processed in the electronic device 100. For example, the display 151 may display execution screen information of an application program executed in the electronic device 100 or user interface (UI) and graphic user interface (GUI) information in response to the execution screen information.

The display 151 may be implemented in two or more in number according to a configured aspect of the electronic device 100. For instance, a plurality of the display units 151 may be arranged on one surface to be spaced apart from or integrated with each other, or may be arranged on different surfaces.

The display 151 may include a touch sensor which senses a touch onto the display so as to receive a control command in a touching manner. When a touch is input to the display 151, the touch sensor may be configured to sense this touch and the processor 180 may generate a control command corresponding to the touch. Contents input in the touch manner may be characters, numbers, instructions in various modes, or a menu item that can be specified.

In this manner, the display 151 may form a flexible touch screen along with the touch sensor, and in this case, the touch screen may function as the user input unit 123 (refer to FIG. 1A). In some cases, the touch screen may replace at least some of functions of a first manipulation unit 123a.

The first audio output module 152a may be implemented as a receiver for transmitting a call sound to a user's ear and the second audio output module 152b may be implemented as a loud speaker for outputting various alarm sounds or multimedia playback sounds.

The optical output module 154 may be configured to output light for indicating an event generation. Examples of such events may include a message reception, a call signal reception, a missed call, an alarm, a schedule alarm, an email reception, information reception through an application, and the like. When a user's event check is sensed, the processor 180 may control the optical output unit 154 to end the output of light.

The first camera 121a may process image frames such as still or moving images obtained by the image sensor in a capture mode or a video call mode. The processed video frames may be displayed on the display 151 or stored in the memory 170.

The first and second manipulation units 123a and 123b are examples of the user input unit 123, which may be manipulated by a user to provide input to the electronic device 100. The first and second manipulation units 123a and 123b may also be commonly referred to as a manipulating portion. The first and second manipulation units 123a and 123b may employ any method if it is a tactile manner allowing the user to perform manipulation with a tactile feeling such as touch, push, scroll or the like. The first and second manipulation units 123a and 123b may also be manipulated through a proximity touch, a hovering touch, and the like, without a user's tactile feeling.

On the other hand, the electronic device 100 may include a fingerprint recognition sensor for recognizing a user's fingerprint, and the processor 180 may use fingerprint information sensed through the finger recognition sensor as an authentication means. The finger scan sensor may be installed in the display 151 or the user input unit 123.

The wired communication module 160 may serve as a path allowing the electronic device 100 to interface with external devices. For example, the wired communication module 160 may be at least one of a connection terminal for connecting to another device (for example, an earphone, an external speaker, or the like), a port for near field communication (for example, an Infrared DaAssociation (IrDA) port, a Bluetooth port, a wireless LAN port, and the like), or a power supply terminal for supplying power to the electronic device 100. The wired communication module 160 may be implemented in the form of a socket for accommodating an external card, such as Subscriber Identification Module (SIM), User Identity Module (UIM), or a memory card for information storage.

The second camera 121b may be further mounted to the rear surface of the terminal body. The second camera 121b may have an image capturing direction, which is substantially opposite to the direction of the first camera unit 121a. The second camera 121b may include a plurality of lenses arranged along at least one line. The plurality of lenses may be arranged in a matrix form. The cameras may be referred to as an 'array camera.' When the second camera 121b is implemented as the array camera, images may be captured in various manners using the plurality of lenses and images with better qualities may be obtained. The flash 125 may be disposed adjacent to the second camera 121b. When an image of a subject is captured with the camera 121b, the flash 125 may illuminate the subject.

The second audio output module 152b may further be disposed on the terminal body. The second audio output module 152b may implement stereophonic sound functions in conjunction with the first audio output module 152a, and may be also used for implementing a speaker phone mode for call communication. Furthermore, the microphone 152c may be configured to receive the user's voice, other sounds, and the like. The microphone 152c may be provided at a plurality of places, and configured to receive stereo sounds.

At least one antenna for wireless communication may be disposed on the terminal body. The antenna may be embedded in the terminal body or formed in the case. Meanwhile, a plurality of antennas connected to the 4G wireless communication module 111 and the 5G wireless communication module 112 may be arranged on a side surface of the terminal. Alternatively, an antenna may be formed in a form of film to be attached onto an inner surface of the rear cover 103 or a case including a conductive material may serve as an antenna.

Meanwhile, the plurality of antennas arranged on a side surface of the terminal may be implemented with four or more antennas to support MIMO. In addition, when the 5G wireless communication module 112 operates in a millimeter wave (mmWave) band, as each of the plurality of antennas is implemented as an array antenna, a plurality of array antennas may be arranged in the electronic device.

A power supply unit 190 (refer to FIG. 1A) for supplying power to the electronic device 100 may be disposed on the terminal body. The power supply unit 190 may include a batter 191 which is mounted in the terminal body or detachably coupled to an outside of the terminal body.

Hereinafter, a multi-communication system structure and an electronic device including the same according to an embodiment, particularly embodiments related to an antenna and an electronic device including the same in a heterogeneous radio system, will be described with reference to the accompanying drawings. It will be apparent to those skilled in the art that the present disclosure may be embodied in other specific forms without departing from the idea or essential characteristics thereof.

Meanwhile, a detailed operation and function of an electronic device having a plurality of antennas according to an embodiment provided with the 4G/5G wireless communication module as shown in FIG. 2A will be described below.

In a 5G communication system according to an embodiment, a 5G frequency band may be a higher frequency band than a sub-6 band. For example, the 5G frequency band may be an mmWave band but is not limited thereto, and may be changed depending on applications.

Figure 3A:
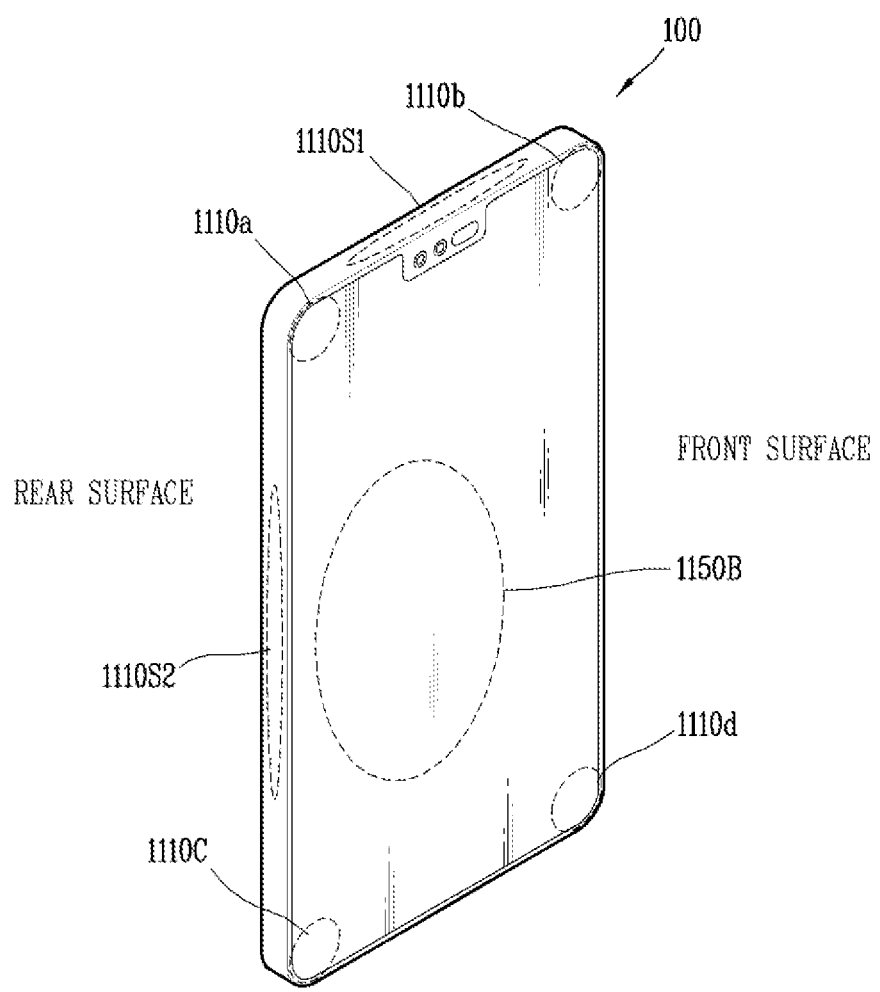
FIG. 3A is an exemplary view showing an example of a configuration in which a plurality of antennas in an electronic device associated with the present disclosure can be arranged.

FIG. 3A illustrates an example of a configuration in which a plurality of antennas in an electronic device according to an embodiment can be arranged. Referring to FIG. 3A, a plurality of antennas 1110a to 1110d may be arranged on an inner side of or a front surface of the electronic device 100. In this regard, the plurality of antennas 1110a to 1110d may be implemented in a form printed on a carrier in an electronic device or in a system-on-chip (Soc) form along with an RFIC. Meanwhile, the plurality of antennas 1110a to 1110d may be disposed on a front surface of the electronic device in addition to an inner side of the electronic device. In this regard, the plurality of antennas 1110a to 1110d disposed on a front surface of the electronic device 100 may be implemented as transparent antennas embedded in a display.

On the other hand, a plurality of antennas 1110S1 and 1110S2 may be disposed on a side surface of the electronic device 100. In this regard, a 4G antenna may be disposed on a side surface of the electronic device 100 in the form of a conductive member, and a slot may be disposed in a conductive member region, and the plurality of antennas 1110a to 1110d may be configured to radiate 5G signals through the slot. Furthermore, antennas 1150B may be arranged on a rear surface of the electronic device 100 to radiate 5G signals to the back.

Meanwhile, the present disclosure may transmit or receive at least one signal through the plurality of antennas 1110S1 and 1110S2 on a side surface of the electronic device 100. In addition, the present disclosure may transmit or receive at least one signal through the plurality of antennas 1110a to 1110d, 1150B, 1110S1, and 1110S2 on a front and/or side surface of the electronic device 100. The electronic device may communicate with a base station through any one of the plurality of antennas 1110a to 1110d, 1150B, 1110S1, and 1110S2. Alternatively, the electronic device may perform multi-input multi-output (MIMO) communication with the base station through two or more antennas among the plurality of antennas 1110a to 1110d, 1150B, 1110S1, and 1110S2.

Figure 3B:
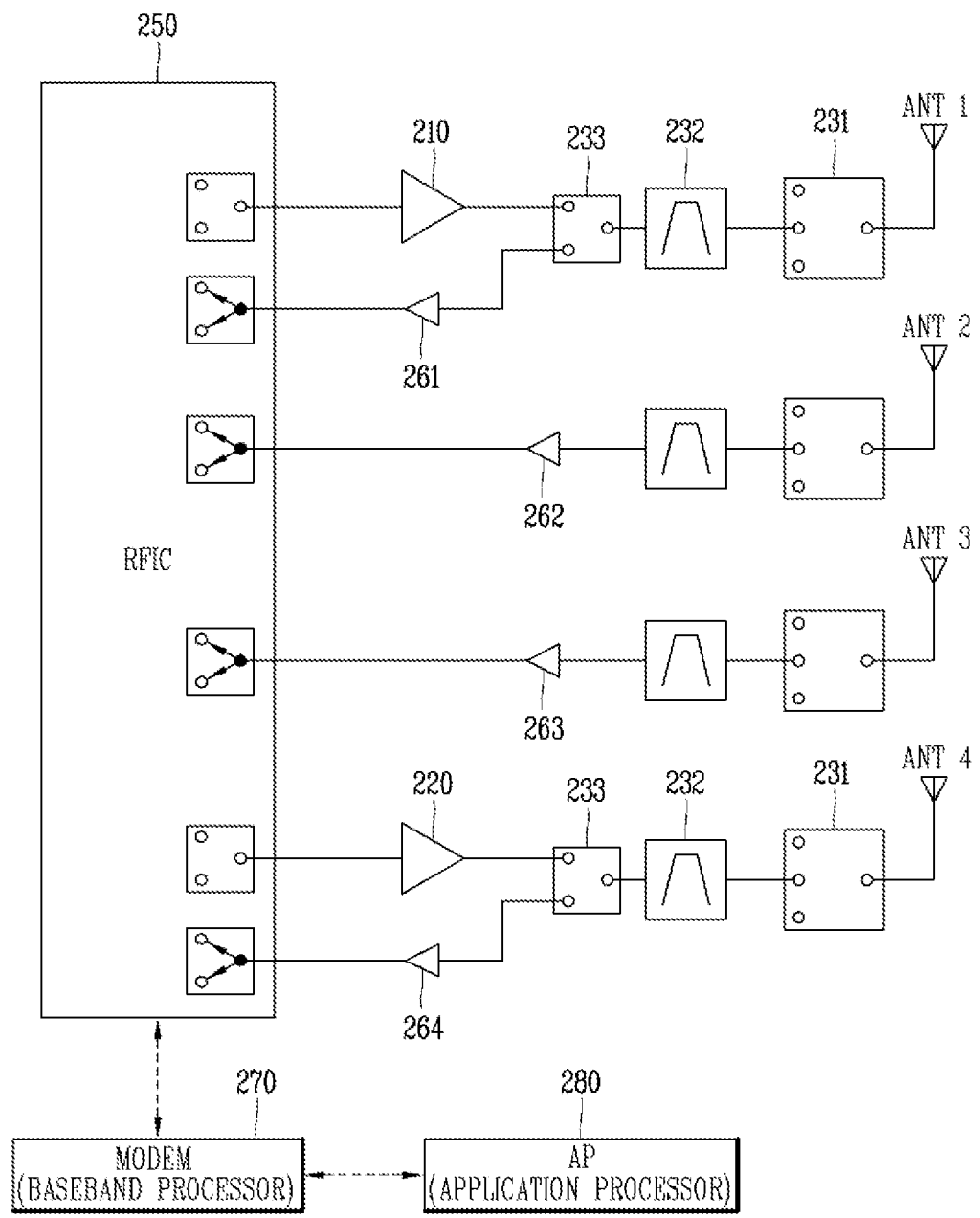
FIG. 3B is a block diagram illustrating a configuration of a wireless communication unit in an electronic device associated with the present disclosure that is operable in a plurality of wireless communication systems.

FIG. 3A is a block diagram illustrating a configuration of a wireless communication module of an electronic device operable in a plurality of wireless communication systems according to an implementation. Referring to FIG. 3B, the electronic device includes a first power amplifier 210, a second power amplifier 220, and an RFIC 250. In addition, the electronic device may further include a modem 270 and an application processor 280. Here, the modem 270 and the application processor (AP) 280 may be physically implemented on a single chip, and may be implemented in a logically and functionally separated form. However, the present disclosure may not be limited thereto and may be implemented in the form of a chip that is physically separated according to an application.

Meanwhile, the electronic device includes a plurality of low noise amplifiers (LNAs) 261 to 264 in the receiver. Here, the first power amplifier 210, the second power amplifier 220, the RFIC 250, and the plurality of low noise amplifiers 261 to 264 are all operable in a first communication system and a second communication system. In this case, the first communication system and the second communication system may be a 4G communication system and a 5G communication system, respectively.

As illustrated in FIG. 2B, the RFIC 250 may be configured as a 4G/5G integration type, but is not limited thereto, and may also be configured as a 4G/5G separation type according to an application. When the RFIC 250 is configured as the 4G/5G integrated type, it may be advantageous in terms of synchronization between 4G and 5G circuits, and simplification of control signaling by the modem 270.

On the other hand, when the RFIC 250 is configured as the 4G/5G separate type, it may be referred to as a 4G RFIC and a 5G RFIC, respectively. In particular, when there is a great band difference between the 5G band and the 4G band, such as when the 5G band is configured as a millimeter wave band, the RFIC 250 may be configured as a 4G/5G separated type. As such, when the RFIC 250 is configured as the 4G/5G separate type, there may be an advantage that the RF characteristics can be optimized for each of the 4G band and the 5G band.

Meanwhile, even when the RFIC 250 is configured as a 4G/5G separation type, the 4G RFIC and the 5G RFIC may be logically and functionally separated but physically implemented on a single chip.

On the other hand, the application processor (AP) 280 is configured to control the operation of each component of the electronic device. Specifically, the application processor (AP) 280 may control the operation of each component of the electronic device through the modem 270.

For example, the modem 270 may be controlled through a power management IC (PMIC) for low power operation of the electronic device. Accordingly, the modem 270 may operate power circuits of a transmitter and a receiver through the RFIC 250 in a low power mode.

In this regard, when it is determined that the electronic device is in an idle mode, the application processor (AP) 280 may control the RFIC 250 through the modem 270 as follows. For example, when the electronic device is in an idle mode, the RFIC 250 may be controlled through the modem 270 such that at least one of the first and second power amplifiers 210, 220 operates in a low power mode or is off.

According to another embodiment, the application processor (AP) 280 may control the modem 270 to provide wireless communication capable of performing low power communication when the electronic device is in a low battery mode. For example, when the electronic device is connected to a plurality of entities among a 4G base station, a 5G base station, and an access point, the application processor (AP) 280 may control the modem 270 to enable wireless communication at the lowest power. Accordingly, the application processor (AP) 280 may control the modem 270 and the RFIC 250 to perform short-range communication using only the short-range communication module 113, even at the expense of throughput.

According to another embodiment, when the remaining battery level of the electronic device is above the threshold, the modem 270 may be controlled to select an optimal wireless interface. For example, the application processor (AP) 280 may control the modem 270 to receive data through both the 4G base station and the 5G base station according to the remaining battery capacity and the available radio resource information. In this case, the application processor (AP) 280 may receive the remaining battery capacity information from the PMIC and the available radio resource information from the modem 270. Accordingly, when the remaining battery capacity and the available radio resources are sufficient, the application processor (AP) 280 may control the modem 270 and the RFIC 250 to receive data through both the 4G base station and 5G base station.

Meanwhile, the multi-transceiving system of FIG. 3B may integrate a transmitter and a receiver of each radio system into a single transceiver. Accordingly, a circuit portion for integrating two types of system signals may be removed from an RF front-end.

In addition, since the front-end component can be controlled by the integrated transceiver, the front-end component can be more efficiently integrated than a case where the transceiving system is separated for each communication system.

In addition, when separated for each communication system, different communication systems cannot be controlled as needed, or because this may lead to a system delay, resources cannot be efficiently allocated. On the contrary, the multi-transceiving system as shown in FIG. 3B may control other communication systems as needed, thereby minimizing system delay due to this, and thus there is an advantage in that efficient resource allocation is possible.

Meanwhile, the first power amplifier 210 and the second power amplifier 220 may operate in at least one of the first and second communication systems. In this regard, when the 5G communication system operates in a 4G band or a sub-6 band, the first and second power amplifiers 210 and 220 may operate in both the first and second communication systems.

On the other hand, when the 5G communication system operates in a millimeter wave (mmWave) band, one of the first and second power amplifiers 210 and 220 may operate in the 4G band and the other in the millimeter-wave band.

On the other hand, two different wireless communication systems may be implemented in one antenna by integrating a transceiver and a receiver to implement a two-way antenna. Here, 4×4 MIMO may be implemented using four antennas as shown in FIG. 3B. At this time, 4×4 DL MIMO may be performed through downlink (DL).

Meanwhile, when the 5G band is a Sub 6 band, first to fourth antennas ANT1 to ANT4 may be configured to operate in both the 4G band and the 5G band. On the contrary, when the 5G band is a millimeter wave (mmWave) band, the first to fourth antennas ANT1 to ANT4 may be configured to operate in one of the 4G band and the 5G band. In this case, when the 5G band is the millimeter wave (mmWave) band, each of the plurality of antennas may be configured as an array antenna in the millimeter wave band.

Meanwhile, 2×2 MIMO may be implemented using two antennas connected to the first power amplifier 210 and the second power amplifier 220 among the four antennas. At this time, 2×2 UL MIMO (2 Tx) may be performed through uplink (UL). Alternatively, the present disclosure is not limited to 2×2 UL MIMO, and may also be implemented as 1 Tx or 4 Tx. In this case, when the 5G communication system is implemented by 1 Tx, only one of the first and second power amplifiers 210 and 220 need to operate in the 5G band. Meanwhile, when the 5G communication system is implemented by 4 Tx, an additional power amplifier operating in the 5G band may be further provided. Alternatively, a transmission signal may be branched in each of one or two transmission paths, and the branched transmission signal may be connected to a plurality of antennas.

On the other hand, a switch-type splitter or power divider is embedded in RFIC corresponding to the RFIC 250. Accordingly, a separate component does not need to be placed outside, thereby improving component mounting performance. Specifically, the transmitters (TXs) of two different communication systems may be selected using a single-pole double-throw (SPDT) type switch in the RFIC corresponding to the RFIC 250.

In addition, the electronic device that is operable in the plurality of wireless communication systems according to an embodiment may further include a duplexer (231), a filter 232 and a switch 233.

The duplexer 231 may be configured to separate a signal in a transmission band and a signal in a reception band from each other. In this case, the signal in the transmission band transmitted through the first and second power amplifiers 210 and 220 may be applied to the antennas ANT1 and ANT4 through a first output port of the duplexer 231. On the contrary, signals in a reception band received through the antennas ANT1 and ANT4 are received by the low noise amplifiers 261 and 264 through a second output port of the duplexer 231.

The filter 232 may be configured to pass a signal in a transmission band or a reception band and to block a signal in a remaining band. In this case, the filter 232 may include a transmission filter connected to the first output port of the duplexer 231 and a reception filter connected to the second output port of the duplexer 231. Alternatively, the filter 232 may be configured to pass only the signal in the transmission band or only the signal in the reception band according to a control signal.

The switch 233 may be configured to transmit only one of a transmission signal and a reception signal. In an implementation of the present disclosure, the switch 233 may be configured in a single-pole double-throw (SPDT) form to separate the transmission signal and the reception signal in a time division duplex (TDD) scheme. In this case, the transmission signal and the reception signal may be in the same frequency band, and thus the duplexer 231 may be implemented in the form of a circulator.

Meanwhile, in another implementation of the present disclosure, the switch 233 may also be applied to a frequency division multiplex (FDD) scheme. In this case, the switch 233 may be configured in the form of a double-pole double-throw (DPDT) to connect or block a transmission signal and a reception signal, respectively. On the other hand, since the transmission signal and the reception signal can be separated by the duplexer 231, the switch 233 may not be necessarily required.

Meanwhile, the electronic device according to an embodiment may further include a modem 270 corresponding to the controller. In this case, the RFIC 250 and the modem 270 may be referred to as a first controller (or a first processor) and a second controller (a second processor), respectively. On the other hand, the RFIC 250 and the modem 270 may be implemented as physically separated circuits. Alternatively, the RFIC 250 and the modem 270 may be logically or functionally distinguished from each other on one physical circuit.

The modem 270 may perform controlling of signal transmission and reception and processing of signals through different communication systems using the RFID 250. The modem 270 may acquire control information from a 4G base station and/or a 5G base station. Here, the control information may be received through a physical downlink control channel (PDCCH), but may not be limited thereto.

The modem 270 may control the RFIC 250 to transmit and/or receive signals through the first communication system and/or the second communication system for a specific time interval and from frequency resources. Accordingly, the RFIC 250 may control transmission circuits including the first and second power amplifiers 210 and 220 to transmit a 4G signal or a 5G signal in the specific time interval. In addition, the RFIC 250 may control reception circuits including the first to fourth low noise amplifiers 261 to 264 to receive a 4G signal or a 5G signal at a specific time interval.

On the other hand, a detailed operation and function of the electronic device having a plurality of antennas according to an embodiment provided with a multi-transceiving system as shown in FIG. 3B will be discussed below.

Figure 4A:
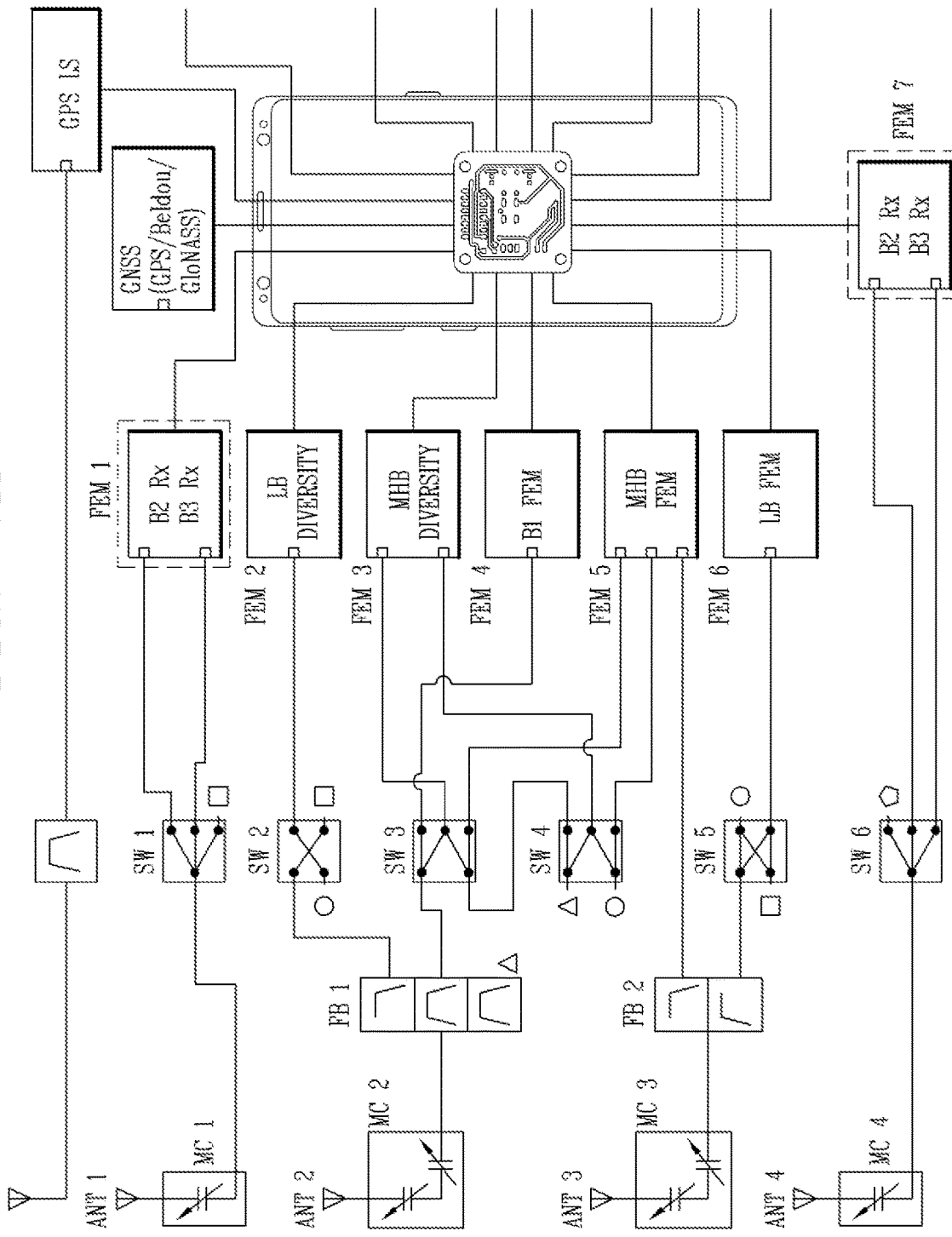
FIG. 4A is a block diagram illustrating a structure in which a plurality of antennas and transceiver circuits are coupled to a processor in an operable manner in an electronic device associated with the present disclosure.
Figure 4B:
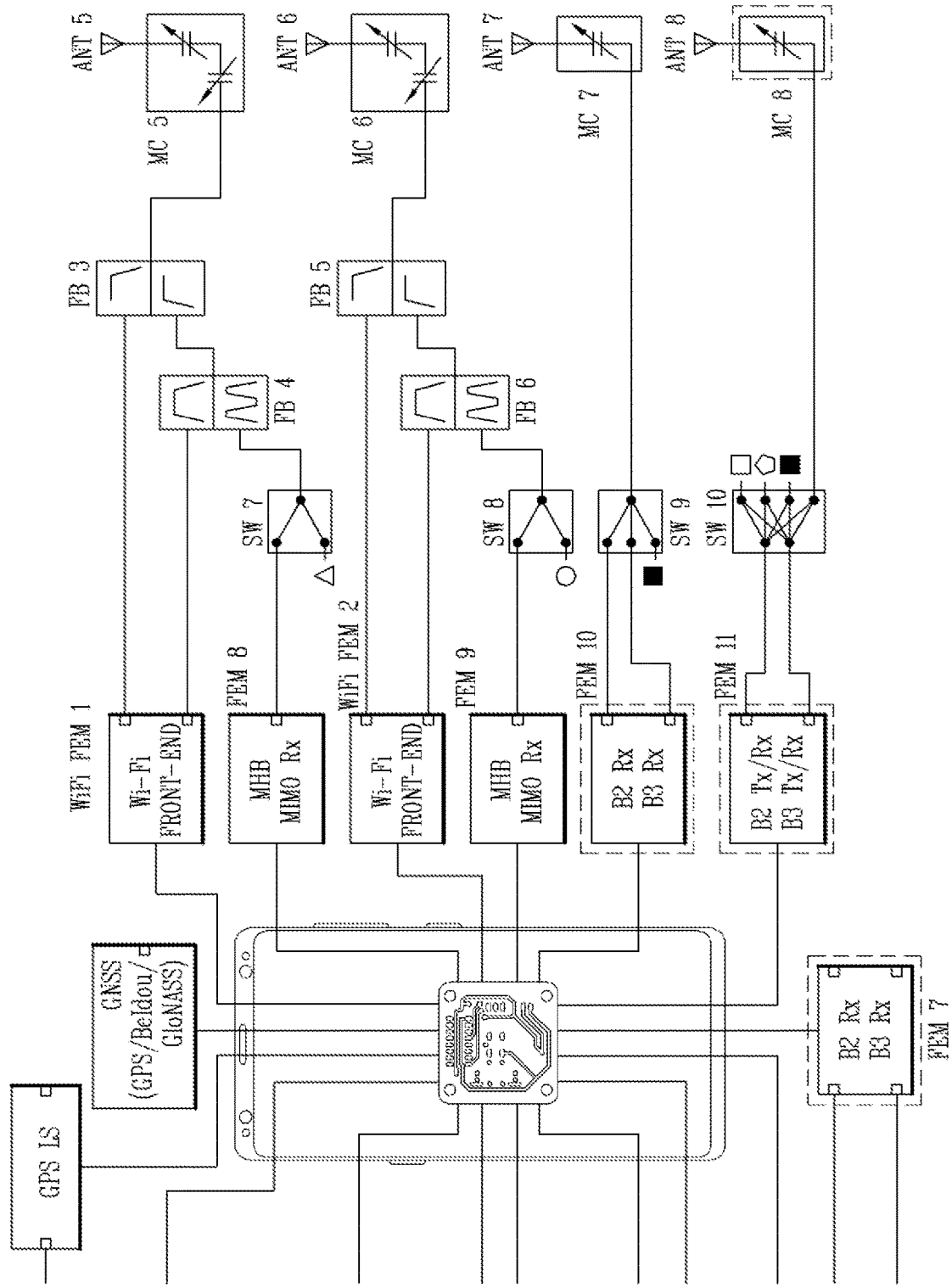
FIG. 4B is a block diagram illustrating a structure in which antennas and transceiver circuits are additionally coupled to a processor in an operable manner in the configuration diagram in FIG. 4A.
Figure 5:
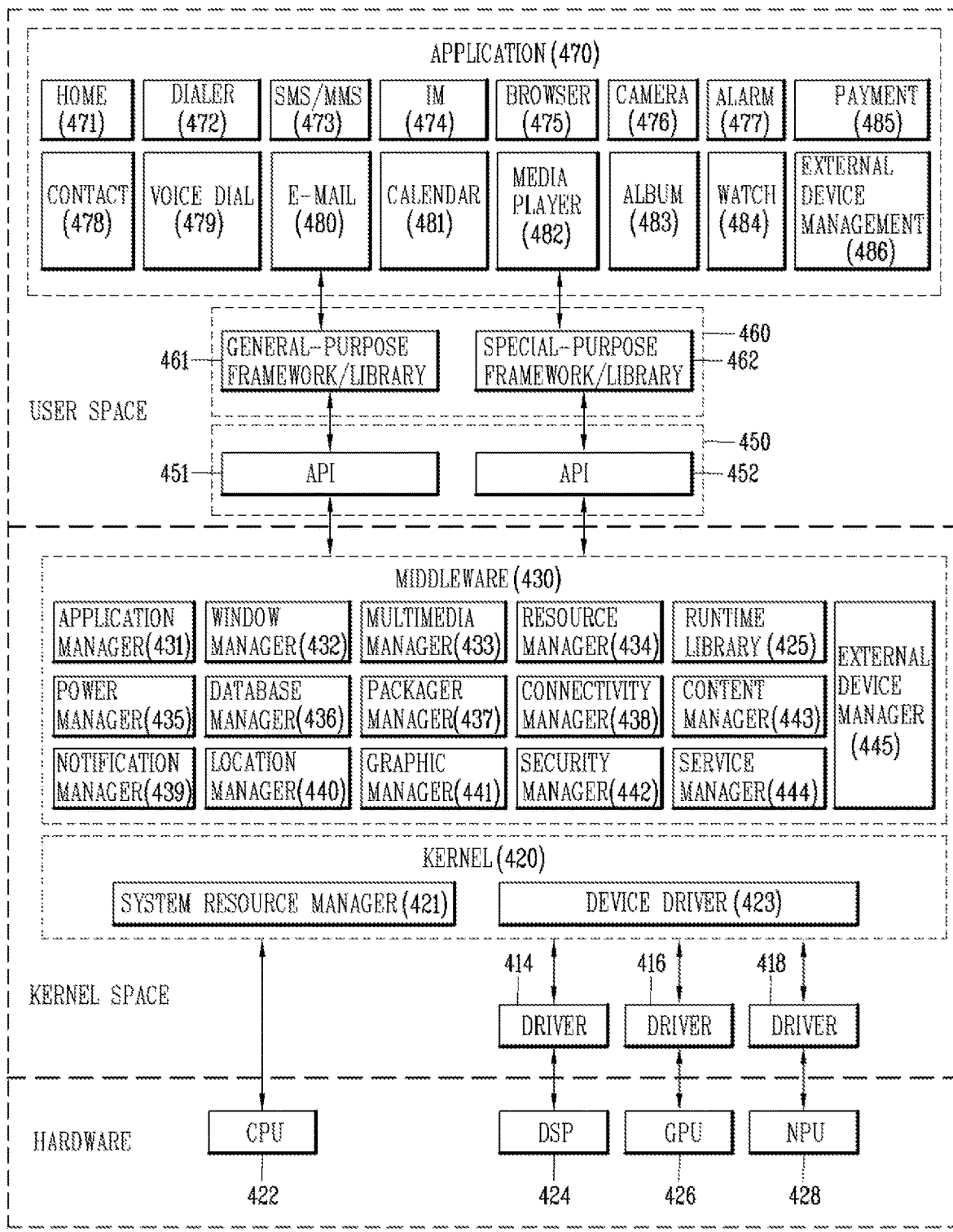
FIG. 5 is a conceptual view illustrating a framework structure associated with an application program operating in an electronic device associated with the present disclosure.

In a 5G communication system according to an embodiment, the 5G frequency band may be a Sub-6 band. In this regard, FIG. 4A is a configuration diagram in which a plurality of antennas and transceiver circuits according to an embodiment are coupled to a processor in an operable manner. FIG. 4B is a configuration diagram in which antennas and transceiver circuits are additionally coupled to a processor in an operable manner in the configuration diagram in FIG. 4A.

Referring to FIGS. 4A and 4B, the electronic device may include a plurality of antennas (ANT1 to ANT4) and front end modules (FEM1 to FEM7) operating in a 4G band and/or a 5G band. In this regard, a plurality of switches SW1 to SW6 may be arranged between the plurality of antennas ANT1 to ANT4 and the front-end modules FEM1 to FEM7.

Referring to FIGS. 4A and 4B, the electronic device may include a plurality of antennas (ANT5 to ANT8) and front end modules (FEM8 to FEM11) operating in a 4G band and/or a 5G band. In this regard, a plurality of switches SW7 to SW10 may be arranged between the plurality of antennas ANT1 to ANT4 and the front-end modules FEM8 to FEM11.

Meanwhile, a plurality of signals that can be branched through the plurality of antennas ANT1 to ANT8 may be transmitted to the input of the front-end modules FEM1 to FEM11 or to the plurality of switches SW1 to SW10 through one or more filters.

For an example, the first antenna ANT1 may be configured to receive signals in a 5G band. In this case, the first antenna ANT1 may be configured to receive a second signal of a second band B2 and a third signal of a third band B3. Here, the second band B2 may be an n77 band and the third band B3 may be an n79 band, but the present disclosure is not limited thereto. The second band B2 and the third band B3 may be changed according to an application. Meanwhile, the first antenna ANT1 may also operate as a transmitting antenna as well as a receiving antenna.

In this regard, the first switch SW1 may be configured as an SP2T switch or an SP3T switch. When implemented as an SP3T switch, one output port may be used as a test port. The first and second output ports of the first switch SW1 may be connected to the inputs of the first front-end module FEM1.

For an example, the eighth antenna ANT2 may be configured to transmit and/or receive signals in the 4G band and/or the 5G band. In this case, the second antenna ANT2 may be configured to transmit/receive a first signal of a first band B1. Here, the first band B1 may be an n41 band, but the present disclosure is not limited thereto, and the first band B1 may be changed according to an application.

Meanwhile, the second antenna ANT2 may operate in a low band LB. In addition, the second antenna ANT2 may be configured to operate in a mid-band MB and/or a high band HB. Here, the MB band and the HB may be referred to as an MHB band.

A first output of the first filter bank FB1 connected to the second antenna ANT2 may be connected to the second switch SW2. Meanwhile, a second output of the first filter bank FB1 connected to the second antenna ANT2 may be connected to the third switch SW3. Furthermore, a third output of the first filter bank FB1 connected to the second antenna ANT2 may be connected to the fourth switch SW4.

Accordingly, an output of the second switch SW2 may be connected to an input of the second front-end module FEM2 operating in the low band LB. Meanwhile, a second output of the third switch SW3 may be connected to an input of the third front-end module FEM3 operating in the MHB band. In addition, a first output of the third switch SW3 may be connected to an input of a fourth front-end module FEM4 operating in a first 5G band B1. Furthermore, a third output of the third switch SW3 may be connected to an input of the fifth front-end module FEM5 operating in the MHB band operating in the first 5G band B1.

In this regard, a first output of the fourth switch SW4 may be connected to an input of the third switch SW3. Meanwhile, a second output of the fourth switch SW4 may be connected to an input of the third front-end module FEM3. In addition, a third output of the fourth switch SW4 may be connected to an input of the fifth front-end module FEM5.

For an example, the third antenna ANT3 may be configured to transmit and/or receive signals in the LB band and/or the MHB band. In this regard, a first output of the second filter bank FB2 connected to the second antenna ANT2 may be connected to an input of the fifth front-end module FEM5 operating in the MHB band. Meanwhile, a second output of the second filter bank FB2 connected to the second antenna ANT2 may be connected to the fifth switch SW5.

In this regard, an output of the fifth switch SW5 may be connected to an input of the sixth front end module FEM6 operating in the LB band.

For an example, the fourth antenna ANT4 may be configured to transmit and/or receive a signal in a 5G band. In this regard, the fourth antenna ANT4 may be configured such that the second band B2 that is a transmission band and the third band B3 that is a reception band are frequency-division multiplexed FDM. Here, the second band B2 may be an n77 band and the third band B3 may be an n79 band, but the present disclosure is not limited thereto. The second band B2 and the third band B3 may be changed according to an application.

In this regard, the fourth antenna ANT4 may be connected to the sixth switch SW6, and one of the outputs of the sixth switch SW6 may be connected to a reception port of the seventh front-end module FEM7. Meanwhile, another one of the outputs of the sixth switch SW6 may be connected to the transmission port of the seventh front-end module FEM7.

For an example, the fifth antenna ANT5 may be configured to transmit and/or receive signals in a WiFi band. Furthermore, the fifth antenna ANT5 may be configured to transmit and/or receive signals in the MHB band.

In this regard, the fifth antenna ANT5 may be connected to the third filter bank FB3, and a first output of the third filter bank FB3 may be connected to a first WiFi module WiFi FEM1. On the other hand, a second output of the third filter bank FB3 may be connected to a fourth filter bank FB4. In addition, a first output of the fourth filter bank FB4 may be connected to the first WiFi module (WiFi FEM1). Meanwhile, a second output of the fourth filter bank FB4 may be connected to the eighth front-end module FEM8 operating in the MHB band through the seventh switch SW7. Therefore, the sixth antenna ANT5 may be configured to receive the WiFi band and 4G/5G band signals.

Similarly, the sixth antenna ANT6 may be configured to transmit and/or receive signals in a WiFi band. Furthermore, the sixth antenna ANT6 may be configured to transmit and/or receive signals in the MHB band.

In this regard, the sixth antenna ANT6 may be connected to a fifth filter bank FB5, and a first output of the fifth filter bank FB5 may be connected to a second WiFi module (WiFi FEM2). On the other hand, a second output of the fifth filter bank FB5 may be connected to a sixth filter bank FB6. In addition, a first output of the sixth filter bank FB6 may be connected to a second WiFi module (WiFi FEM2). A second output of the sixth filter bank FB6 may be connected to the ninth front-end module FEM9 operating in the MHB band through the eighth switch SW8. Therefore, the sixth antenna ANT6 may be configured to receive the WiFi band and 4G/5G band signals.

Referring to FIGS. 3B, 4A, and 4B, the baseband processor, that is, the modem 270, may control antennas and the transceiver circuit (RFIC) 250 to perform multi-input multi-output (MIMO) or diversity in the MHB band. In this regard, the second antenna ANT2 and the third antenna ANT3 adjacent thereto may be used in a diversity mode for transmitting and/or receiving the same information as a first signal and a second signal. On the contrary, antennas disposed on different side surfaces may be used in the MIMO mode in which first information is included in the first signal and second information is included in the second signal. For an example, the baseband processor 1400 may perform MIMO through the second antenna ANT2 and the fifth antenna ANT5. In another example, the baseband processor, that is, the modem 270, may perform MIMO through the second antenna (ANT2) and the sixth antenna (ANT6).

For an example, the seventh antenna (ANT7) may be configured to receive signals in a 5G band. In this case, the seventh antenna ANT7 may be configured to receive a second signal of a second band B2 and a third signal of a third band B3. Here, the second band B2 may be an n77 band and the third band B3 may be an n79 band, but the present disclosure is not limited thereto. The second band B2 and the third band B3 may be changed according to an application. Meanwhile, the seventh antenna ANT7 may also operate as a transmitting antenna as well as a receiving antenna.

In this regard, the ninth switch SW9 may be configured as an SP2T switch or an SP3T switch. When implemented as an SP3T switch, one output port may be used as a test port. On the other hand, the first and second output ports of the ninth switch SW9 may be connected to the inputs of the tenth front-end module FEM10.

For an example, the eighth antenna ANT8 may be configured to transmit and/or receive signals in the 4G band and/or the 5G band. In this case, the eighth antenna ANT8 may be configured to transmit/receive a signal of the second band B2. In addition, the eighth antenna ANT8 may be configured to transmit/receive a signal of the third band B3. Here, the second band B2 may be an n77 band and the third band B3 may be an n79 band, but the present disclosure is not limited thereto. The second band B2 and the third band B3 may be changed according to an application. In this regard, the eighth antenna ANT8 may be connected to the eleventh front-end module FEM11 through the tenth switch SW10.

Meanwhile, the antennas ANT1 to ANT8 may be connected to impedance matching circuits MC1 to MC8 to operate in a plurality of bands. In this regard, when operating in adjacent bands such as the first antenna ANT1, the fourth antenna ANT4, the seventh antenna ANT7 and the eighth antenna ANT8, only one variable element may be used. In this case, the variable element may be a variable capacitor configured to vary the capacitance by varying the voltage.

On the contrary, when operating in spaced bands such as the second antenna ANT2, the third antenna ANT3, the fifth antenna ANT5, and the sixth antenna ANT6, only two or more variable elements may be used. In this case, the two or more variable elements may be two or more variable capacitors or a combination of variable inductors and variable capacitors.

Referring to FIGS. 3B, 4A, and 4B, the baseband processor 270 may perform MIMO through at least one of the second band (B2) and the third band B3 in a 5G band. In this regard, the baseband processor 270 may perform MIMO through at least two of the first antenna ANT1, the fourth antenna ANT4, the seventh antenna ANT7, and the eighth antenna ANT8 in the second band B2. On the other hand, the baseband processor 270 may perform MIMO through at least two of the first antenna ANT1, the fourth antenna ANT4, the seventh antenna ANT7, and the eighth antenna ANT8 in the third band B3. Accordingly, the baseband processor 270 may control the plurality of antennas and the transceiver circuit 250 to support MIMO up to 4 RXs as well as 2 RXs in the 5G band.

Meanwhile, an application program operating in the electronic device described herein may be executed in conjunction with a user space, a kernel space, and hardware. In this regard, the program module 410 may include a kernel 420, middleware 430, an API 450, a framework/library 460, and/or an application 470. At least part of the program module 410 may be pre-loaded on an electronic device or downloaded from an external device or a server.

The kernel 420 may include a system resource manager 421 and/or a device driver 423. The system resource manager 421 may perform control, allocation, or retrieval of system resources. According to one embodiment, the system resource manager 421 may include a process manager, a memory manager, or a file system manager. The device driver 423 may include a display driver, a camera driver, a Bluetooth driver, a shared memory driver, a USB driver, a keypad driver, a WiFi driver, an audio driver, or an inter-process communication (IPC) driver. The middleware 430 may provide functions commonly required by the application 470 or provide various functions to the application 470 through the API 460, for example, to allow the application 470 to use limited system resources inside the electronic device.

The middleware 430 may include at least one of a runtime library 425, an application manager 431, a window manager 432, a multimedia manager 433, a resource manager 434, a power manager 435, a database manager 436, a package manager 437, a connectivity manager 438, a notification manager 439, a location manager 440, a graphic manager 441, a security manager 442, a content manager 443, a service manager 444 and an external device manager 445.

The framework/library 460 may include a general-purpose framework/library 461 and a special-purpose framework/library 462. Here, the general-purpose framework/library 461 and the special-purpose framework/library 462 may be referred to as a first framework/library 451 and a second framework/library 452, respectively. The first framework/library 461 and the second framework/library 462 may be interfaced with a kernel space and hardware through the first API 451 and the second API 452, respectively. Here, the second framework/library 452 may be an exemplary software architecture capable of modularizing artificial intelligence (AI) functions. Using the architecture, the various processing blocks of hardware implemented with a System on Chip (SoC) (e.g., CPU 422, DSP 424, GPU 426, and/or NPU 428) may perform functions for supporting operations during the runtime operation of the application 470.

The application 470 may include a home 471, a dialer 472, an SMS/MMS 473, an instant message 474, a browser 475, a camera 476, an alarm 477, a contact 478, a voice dial 479, an email 480, a calendar 481, a media player 482, an album 483, a watch 484, a payment 485, an accessory management 486, a health care, or an environmental information providing application.

An AI application may be configured to call functions defined in a user space capable of allowing the electronic device to provide for detection and recognition of a scene indicating a location at which it is currently operating. The AI application may configure a microphone and a camera differently depending on whether the recognized scene is an indoor space or an outdoor space. The AI application may make a request for compiled program codes associated with a library defined in a scene detect application programming interface (API) to provide an estimate of the current scene. This request may rely on the output of a deep neural network configured to provide scene estimates based on video and location data.

The framework/library 462, which may be compiled codes of the Runtime Framework, may be further accessible by the AI application. The AI application may cause a runtime framework engine to request scene estimation triggered at specific time intervals or by events detected by the application's user interface. When estimating a scene, the runtime engine may then send a signal to an operating system such as a Linux kernel running on the SoC. The operating system may cause the operation to be performed on the CPU 422, the DSP 424, the GPU 426, the NPU 428, or some combination thereof. The CPU 422 may be accessed directly by the operating system and other processing blocks may be accessed via a driver such as a driver 414 to 418 for the DSP 424, the GPU 426, or the NPU 428. In an illustrative example, a deep neural network and an AI algorithm may be configured to run on a combination of processing blocks, such as the CPU 422 and the GPU 426, or an AI algorithm such as a deep neural network may run on the NPU 428.

The AI algorithm performed through the special-purpose framework/library as described above may be performed only by the electronic device or by a server supported scheme. When the AI algorithm is performed by the server supported scheme, the electronic device may receive and transmit information associated with the AI server and AI processing through the 4G/5G communication system.

Figure 6A:
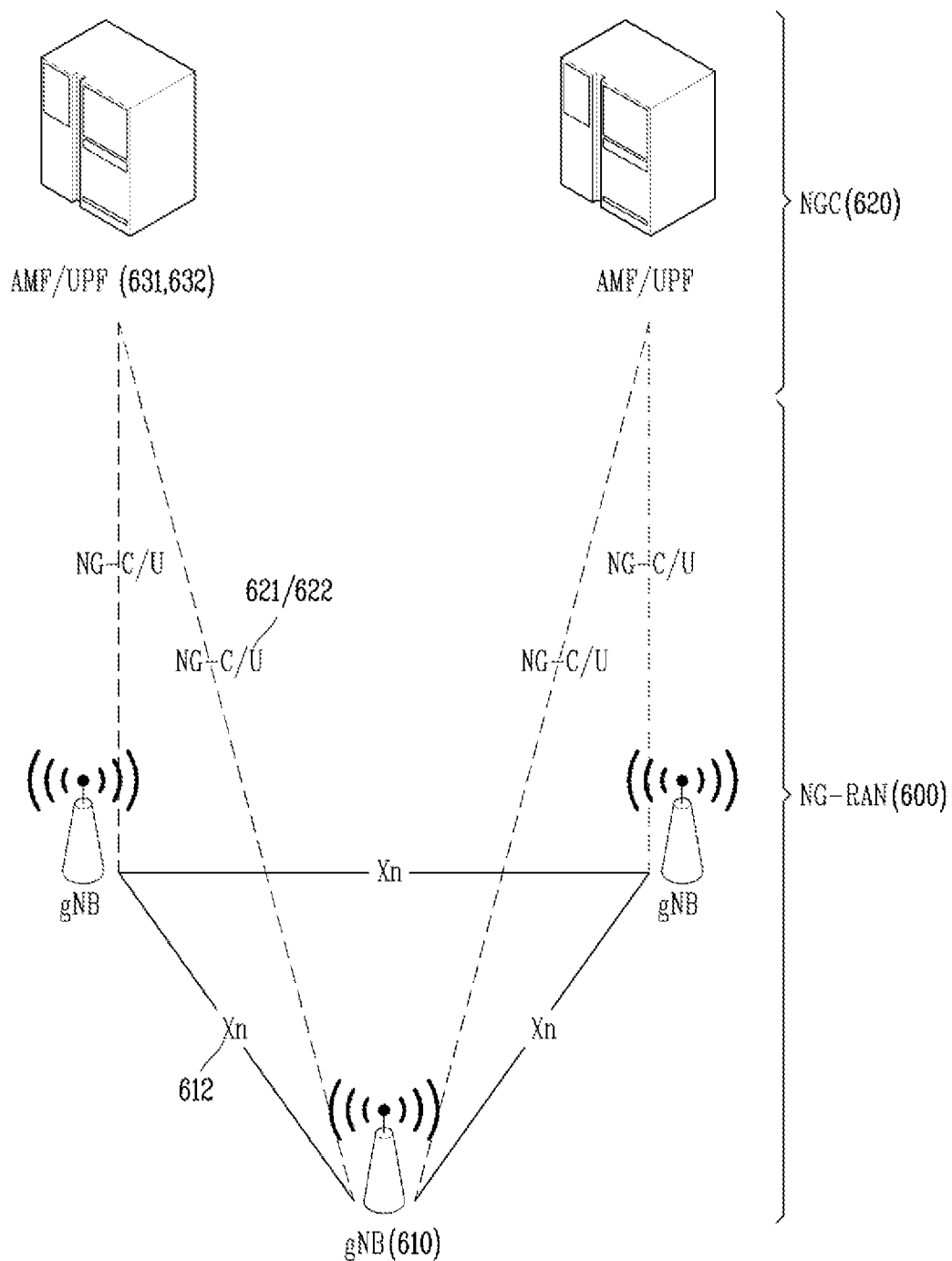
FIGS. 6A and 6B are structural diagrams for explaining the structure of a wireless communication system in an electronic device associated with the present disclosure.

Referring to FIG. 6A, a Next Generation Radio Access Network (NG-RAN) 600 consists of gNBs 310 that provide control plane (RRC) protocol terminations for a user plane (new sublayer/PDCP/RLC/MAC/PHY) and a user equipment (UE).

The gNBs 610 are interconnected via an Xn interface 612. The gNB 610 is also connected to a Next Generation Core (NGC) 620 via an NG interface. More specifically, the gNB 610 is connected to an Access and Mobility Management Function (AMF) 631 through an N2 interface, and to a User Plane Function (UPF) 632 through an N3 interface.

On the other hand, the NG-C interface 621 may denote a control plane interface between the NG-RAN 600 and the NGC 620. In addition, the NG-U interface 622 may denote a user plane interface between the NG-RAN 600 and the NGC 620.

More specifically, in the control plane, functions related to interface management and error handling (e.g., setup, reset, component removal, update), connection mode and mobility management (handover procedure, sequence number and state management, terminal context recovery), RAN paging support, and dual connectivity (addition, reset, modification, releasing of a secondary node) may be carried out. Meanwhile, the user plane may perform functions related to transfer of data or flow control of data.

Meanwhile, a wireless communication system including the electronic device and the base station (gNB) described with reference to FIG. 6A will be described below. In this regard, FIG. 6B illustrates a block diagram of a wireless communication system that is applicable to methods proposed herein.

Figure 6B:
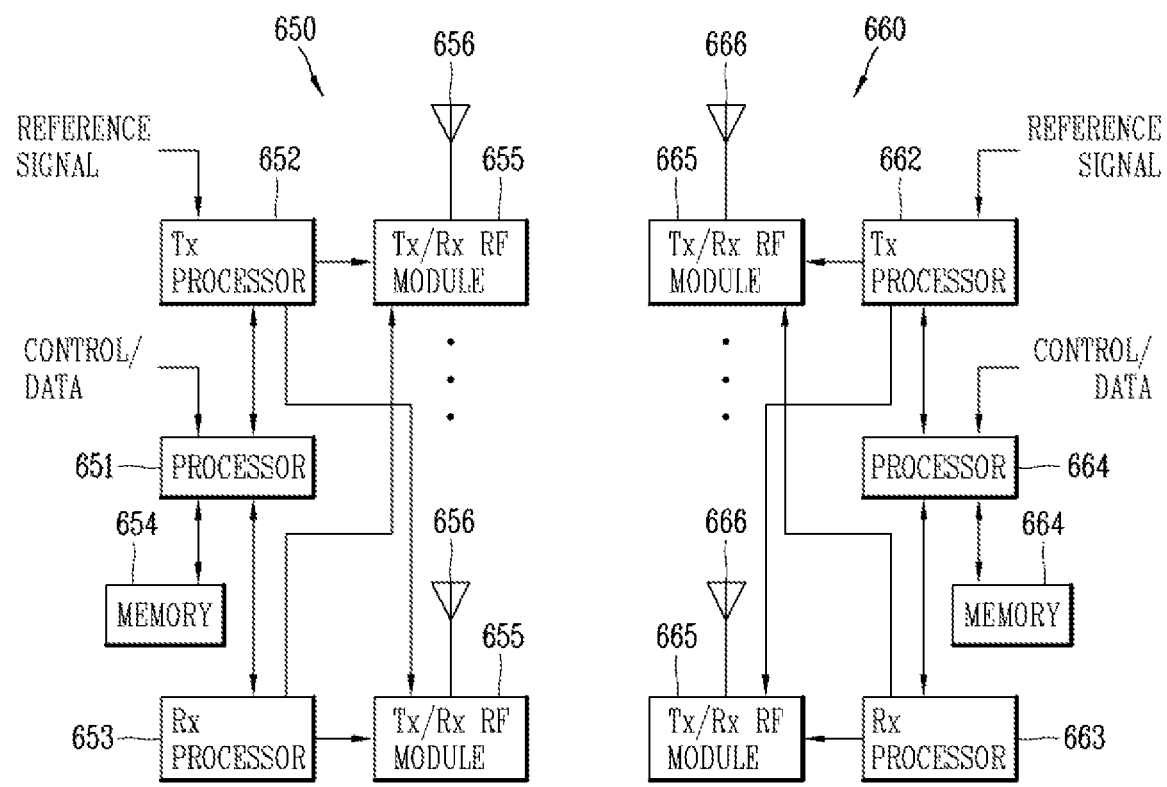

Referring to FIG. 6B, the wireless communication system includes a first communication device 650 and/or a second communication device 660. "A and/or B" may be interpreted to denote the same as "comprising at least one of A and B". The first communication device may represent a base station, and the second communication device may represent a terminal (or the first communication device may represent a terminal, and the second communication device may represent a base station).

The base station (BS) may be replaced with a term such as a fixed station, a Node B, an evolved-NodeB (eNB), a Next Generation NodeB (gNB), a base transceiver system (BTS), an access point (AP), or a general NB (gNB), a 5G system, a network, an AI system, a road side unit (RSU), robot or the like.

In addition, a terminal may be fixed or mobile, and may include a user equipment (UE), a mobile station (MS), a user terminal (UT), a mobile subscriber station (MSS), a subscriber station (SS), and an advanced mobile (AMS), a wireless terminal (WT), a machine-type communication (MTC) device, a machine-to-machine (M2M) device, a device-to-device (D2D) device, a vehicle, a robot, an AI module or the like.

The first communication device 650 and the second communication device 660 are processors 651, 661, memories 654, 664, one or more Tx/Rx RF modules 655, 665, Tx processors 652, 662, Rx processors 653, 663, and antennas 656, 666. The processors 651, 661 implement functions, processes and/or methods described above and functions, processes and/or methods described below. More specifically, in the DL (communication from the first communication device 650 to the second communication device 660), upper layer packets from the core network (NGC) are provided to the processor 651. The processor 651 implements a function of a L2 layer. In the DL, the processor 651 provides multiplexing, radio resource allocation between a logical channel and a transport channel to the second communication device 660, and is responsible for signaling to the second communication device 660.

A transmit (TX) processor 652 implements various signal processing functions for a L1 layer (i.e., physical layer). The signal processing functions facilitate forward error correction (FEC) in the second communication device 660, and include coding and interleaving. The encoded and modulated symbols are divided into parallel streams, and each stream is mapped to an OFDM subcarrier, and multiplexed with a reference signal (RS) in a time and/or frequency domain, and combined together using an Inverse Fast Fourier Transform (IFFT) to create a physical channel carrying a time-domain OFDMA symbol stream.

An OFDM stream is spatially precoded to produce multiple spatial streams. Each spatial stream may be provided to different antennas 656 through individual Tx/Rx modules (or transceivers 655). Each Tx/Rx module may modulate an RF carrier with each spatial stream for transmission.

In the second communication device 660, each Tx/Rx module (or transceiver) 665 receives a signal through each antenna 666 of each Tx/Rx module 665. Each Tx/Rx module 665 recovers information modulated onto an RF carrier, and provides it to the receive (RX) processor 663. The RX processor 663 implements various signal processing functions of layer 1. The RX processor 663 may perform spatial processing on the information to recover any spatial streams destined for the second communication device 660. If multiple spatial streams are directed to the second communication device 660, they may be combined into a single OFDMA symbol stream by multiple RX processors 663. The RX processor 663 converts the OFDMA symbol stream from a time domain to a frequency domain using fast Fourier transform (FFT).

The frequency domain signal includes an individual OFDMA symbol stream for each subcarrier of the OFDM signal. The symbols and reference signal on each subcarrier are recovered and demodulated by determining the most likely signal placement points transmitted by the first communication device. Such soft decisions may be based on channel estimate values. The soft decisions are decoded and deinterleaved to recover data and control signals originally transmitted by the first communication device 650 on the physical channel. The corresponding data and control signals are provided to the processor 661.

The UL (communication from the second communication device 660 to the first communication device 650) is processed at the first communication device 650 in a similar manner to that described in connection with a receiver function at the second communication device 660. Each Tx/Rx module 665 receives a signal via each antenna 666. Each Tx/Rx module 665 provides an RF carrier and information to the RX processor 663. The processor 661 may be associated with the memory 664 that stores program codes and data. The memory 664 may be referred to as a computer readable medium.

Meanwhile, referring to the drawings described above, a 5G wireless communication system, that is, 5G new radio access technology (NR) may be provided. In this regard, as more communication devices demand larger communication capacities, there is a need for improved mobile broadband communication as compared to radio access technology in the related art. In addition, massive MTC (Machine Type Communications), which connects multiple devices and objects to provide various services anytime and anywhere, is also one of major issues to be considered in next-generation communication. In addition, communication system design in consideration of services/terminals that are sensitive to reliability and latency is being discussed. As described above, introduction of next-generation radio access technology in consideration of enhanced mobile broadband communication (eMBB), massive MTC (mMTC), ultra-reliable and low latency communication (URLLC), and the like, is being discussed, and the relevant technology is referred to herein as NR for the sake of convenience. The NR is an expression showing an example of 5G radio access technology (RAT).

A new RAT system including the NR uses an OFDM transmission scheme or a similar transmission scheme. The new RAT system may follow OFDM parameters different from the OFDM parameters of LTE. Alternatively, the new RAT system may follow the existing numerology of LTE/LTE-A as it is but have a larger system bandwidth (e.g., 100 MHz). Alternatively, a single cell may support a plurality of numerologies. In other words, electronic devices operating with different numerologies may coexist in a single cell.

In this regard, in the case of 4G LTE, since the maximum bandwidth of the system is limited to 20 MHz, a single sub-carrier spacing (SCS) of 15 KHz is used. However, since 5G NR supports a channel bandwidth between 5 MHz and 400 MHz, FFT processing complexity may increase to process the entire bandwidth through a single subcarrier spacing. Accordingly, the subcarrier spacing used for each frequency band may be extended and applied.

A numerology corresponds to one subcarrier spacing in the frequency domain. By scaling a reference subcarrier spacing to an integer N, different numerologies may be defined. In this regard, FIG. 4A shows an example of a frame structure in NR. On the other hand, FIG. 4B shows a change in a slot length in accordance with a change in the subcarrier spacing in the NR.

An NR system may support a number of numerologies. Here, a numerology may be defined by a subcarrier spacing and a cyclic prefix overhead. Here, a plurality of subcarrier spacings may be derived by scaling a basic subcarrier spacing to an integer N. Furthermore, even when it is assumed that a very low subcarrier spacing is not used at a very high carrier frequency, the used numerology may be selected independently of the frequency band. In addition, in an NR system, various frame structures according to a number of numerologies may be supported.

Hereinafter, an Orthogonal Frequency Division Multiplexing (OFDM) numerology and frame structure that can be considered in the NR system will be described. A number of OFDM numerologies supported in the NR system may be defined as shown in Table 1 below.

TABLE 1

| μ | $\Delta f = 2^\mu \times 15[kHz]$ | Cyclic prefix (CP) |
|---|---|---|
| 0 | 15 | Normal |
| 1 | 30 | Normal |
| 2 | 60 | Normal, Extended |
| 3 | 120 | Normal |
| 4 | 240 | Normal |

NR supports a number of numerologies (or subcarrier spacings (SCSs)) for supporting various 5G services. For example, NR supports a wide area in traditional cellular bands when the SCS is 15 kHz, and supports a dense-urban, a lower latency and a wider carrier bandwidth when the SCS is 30 kHz/60 kHz, and supports a bandwidth greater than 24.25 GHz to overcome phase noise when the SCS is 60 kHz or higher.

The NR frequency band is defined as a frequency range of two types (FR1, FR2). The FR1 is a sub-6 GHz range, and the FR2 is a range of above 6 GHz, which may denote millimeter waves (mmWs).

Table 2 below shows the definition of the NR frequency band.

TABLE 2

| Frequency Range designation | Corresponding frequency range | Subcarrier Spacing |
|---|---|---|
| FR1 | 450 MHz-6000 MHz | 15, 30, 60 KHz |
| FR2 | 24250 MHz-52600 MHz | 60, 120, 240 KHz |

Figure 7A:
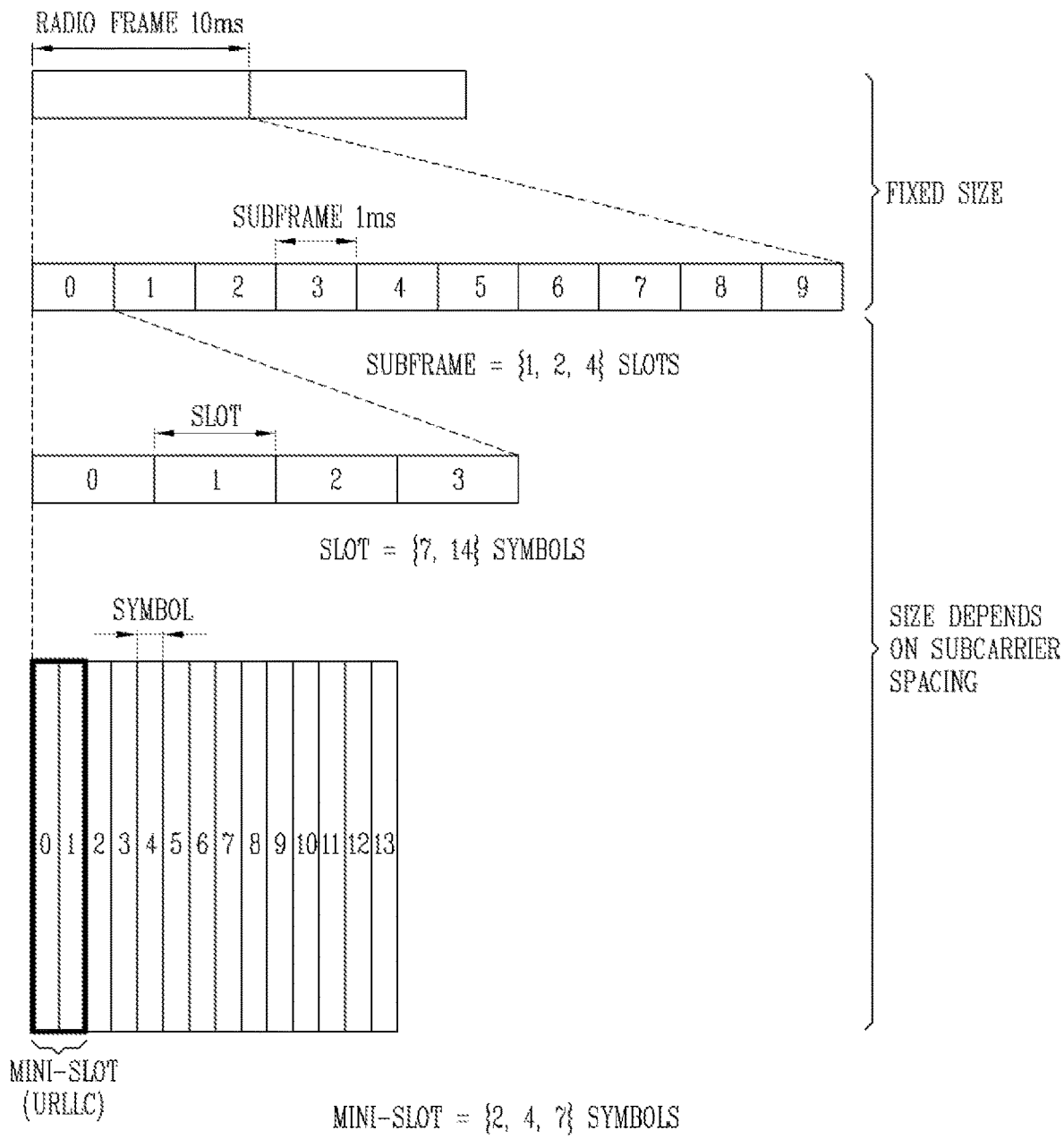

With regard to a frame structure in a NR system, the sizes of various fields in the time domain are expressed in multiples of a specific time unit. FIG. 7A illustrates an example of an SCS of 60 kHz, in which one subframe may include four slots. One subframe={1,2,4} slots shown in FIG. 7A is an example, in which the number of slot(s) that can be included in one subframe may be one, two or four.

Furthermore, a mini-slot may include two, four or seven symbols or may include more or fewer symbols.

Referring to FIG. 7B, a subcarrier spacing of 5G NR phase I and an OFDM symbol length according thereto are shown. Each subcarrier spacing is extended by a multiplier of two, and the symbol length is inversely reduced. In FR1, subcarrier spacings of 15 kHz, 30 kHz, and 60 kHz are available, depending on the frequency band/bandwidth. In FR2, 60 kHz and 120 kHz may be used for data channels, and 240 kHz may be used for synchronization signals.

In 5G NR, a basic unit of scheduling may be defined as a slot, and the number of OFDM symbols included in a single slot may be limited to 14 as shown in FIG. 7A or 7B regardless of the subcarrier spacing. Referring to FIG. 7B, when a wide subcarrier spacing is used, the length of one slot may decrease in inverse proportion to reduce transmission delay in a wireless section. In addition, in order to efficiently support ultra reliable low latency communication (uRLLC), in addition to slot-based scheduling, mini-slot (e.g., 2, 4, 7 symbols) unit scheduling may be supported as described above.

In consideration of the foregoing technical features, slots in 5G NR described herein may be provided at the same interval as those in 4G LTE or may be provided with slots of various sizes. For an example, in 5G NR, the slot interval may be configured to be 0.5 ms equal to that of 4G LTE. For another example, the slot interval in 5G NR may be configured to be 0.25 ms, which is a narrower interval than that of 4G LTE.

In this regard, the 4G communication system and the 5G communication system may be referred to as a first communication system and a second communication system, respectively. Accordingly, a first signal (first information) of the first communication system may be a signal (information) in a 5G NR frame having a slot interval that is scalable to 0.25 ms, 0.5 ms, and the like. On the contrary, a second signal (second information) of the second communication system may be a signal (information) in a 4G LTE frame having a fixed slot interval of 0.5 ms.

Meanwhile, the first signal of the first communication system may be transmitted and/or received through a maximum bandwidth of 20 MHz. On the contrary, the second signal of the second communication system may be transmitted and/or received through a variable channel bandwidth of 5 MHz to 400 MHz. In this regard, the first signal of the first communication system may be FFT-processed at a single sub-carrier spacing (SCS) of 15 KHz.

On the other hand, the second signal of the second communication system may be FFT-processed at subcarrier spacings of 15 kHz, 30 kHz, and 60 kHz according to the frequency band/bandwidth. In this case, the second signal of the second communication system may be modulated and frequency-converted into a FR1 band and transmitted through a 5G Sub-6 antenna. Meanwhile, the FR1 band signal received through the 5G Sub-6 antenna may be frequency-converted and demodulated. Then, the second signal of the second communication system may be IFFT-processed at subcarrier spacings of 15 kHz, 30 kHz, and 60 kHz according to the frequency band/bandwidth.

On the other hand, the second signal of the second communication system may be FFT-processed at spacings of 60 kHz, 120 kHz, and 240 kHz according to the frequency band/bandwidth and data/synchronous channel. In this case, the second signal of the second communication system may be modulated in a FR2 band and transmitted through a 5G mmWave antenna. Meanwhile, the FR2 band signal received through the 5G mmWave antenna may be frequency converted and demodulated. Then, the second signal of the second communication system may be IFFT-processed through subcarrier spacings of 60 kHz, 120 kHz, and 240 kHz according to the frequency band/bandwidth and data/synchronous channel.

In 5G NR, symbol-level time alignment may be used for transmission schemes using various slot lengths, mini-slots, and different subcarrier spacings. Accordingly, the present disclosure provides flexibility to efficiently multiplex various communication services such as enhancement mobile broadband (eMBB) and ultra-reliable low latency communication (uRLLC) in the time domain and the frequency domain. In addition, unlike 4G LTE, 5G NR may define uplink/downlink resource allocation at a symbol level within a single slot as shown in FIG. 3B. In order to reduce a hybrid automatic repeat request (HARQ) delay, a slot structure capable of directly transmitting HARQ ACK/NACK in a transmission slot may be defined. This slot structure may be referred to as a self-contained structure.

Unlike 4G LTE, 5G NR may support a common frame structure constituting an FDD or TDD frame through a combination of various slots. Accordingly, a dynamic TDD scheme may be adopted to freely dynamically adjust the transmission direction of individual cells according to traffic characteristics.

Figure 8A:
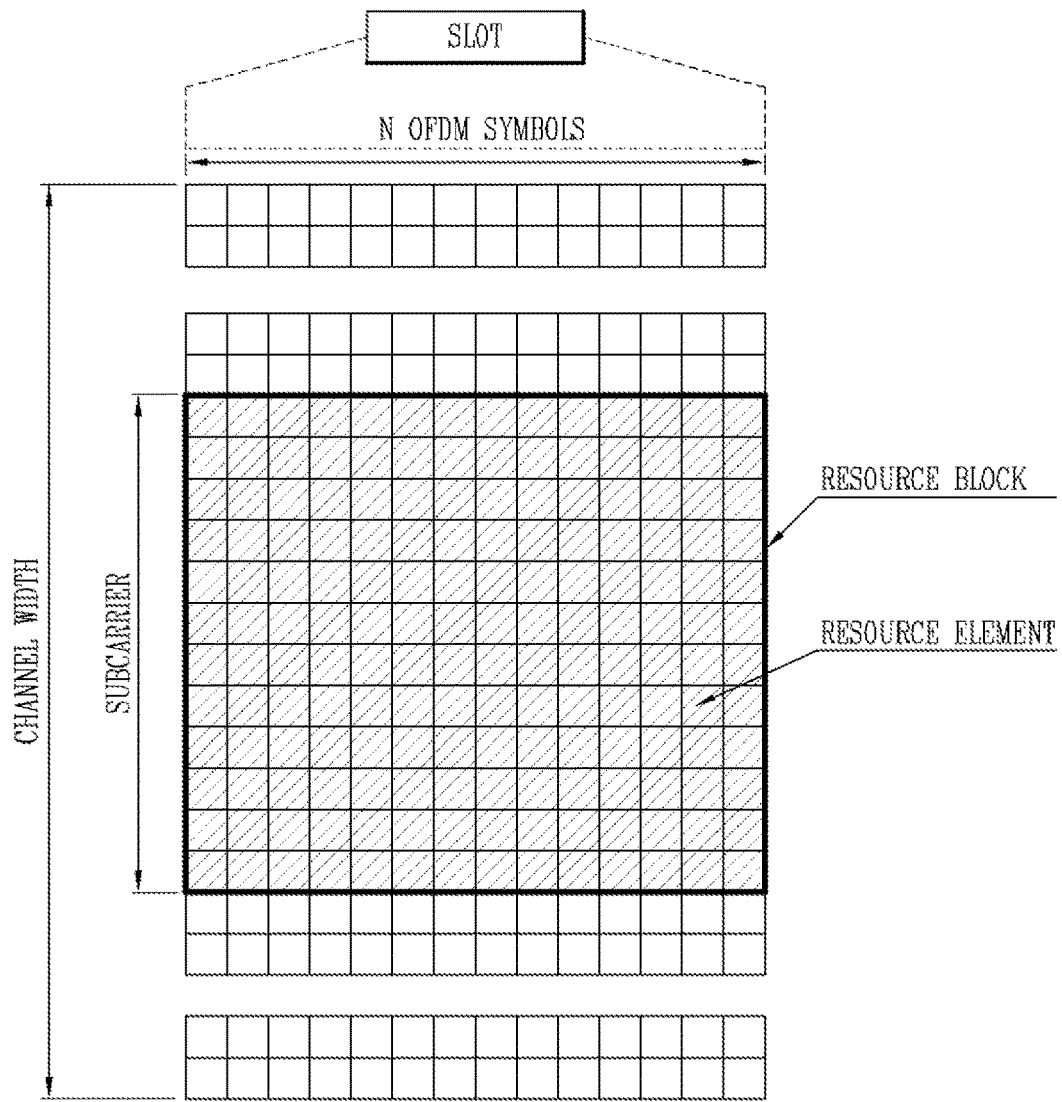
FIGS. 8A and 8B are conceptual diagrams illustrating a time and frequency resource structure according to a 5G communication scheme.

Meanwhile, a resource structure of the time domain and the frequency domain may define an NR resource grid as shown in FIG. 8A. According to the subcarrier spacing (SCS), the resource grid may be changed as the number of available subcarriers and OFDM symbols varies. In other words, with regard to each numerology and carrier, NR may define a resource grid having a width, which is a value of the maximum number of resource blocks per subcarrier spacing multiplied by the number of subcarriers per resource block and a length, which is a value determined by the number of OFDM symbols per subframe.

Figure 8B:
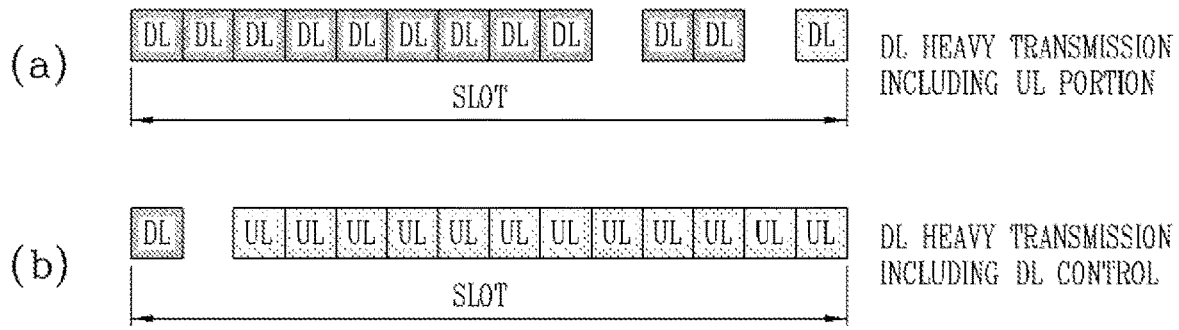

In addition, to support the agile and efficient use of TDD resources, the NR may implement a flexible slot structure. For an example, as shown in (a) and (b) of FIG. 8B, a slot may be allocated with all DLs (DownLinks) and all ULs (UploadLinks). Alternatively, a mixture of DLs and ULs may be allocated to service asymmetric traffic. DL control may take place at the beginning of the slot, UL control may take place at the end thereof, and a mixed DL/UL slot may be statically configured as in an LTE DL/UL TDD configuration, or the allocation of a DL/UL mixture can be dynamically changed. Therefore, efficiency and scheduling may be improved according to traffic requirements.

On the other hand, the electronic device 100 described herein may maintain a connection state between a 4G base station (eNB) and a 5G base station (eNB) through the 4G wireless communication module 111 and/or the 5G wireless communication module 112. In this regard, as described above, FIG. 9 illustrates a configuration in which the electronic device 100 is interfaced with a plurality of base stations or network entities.

Figure 9:
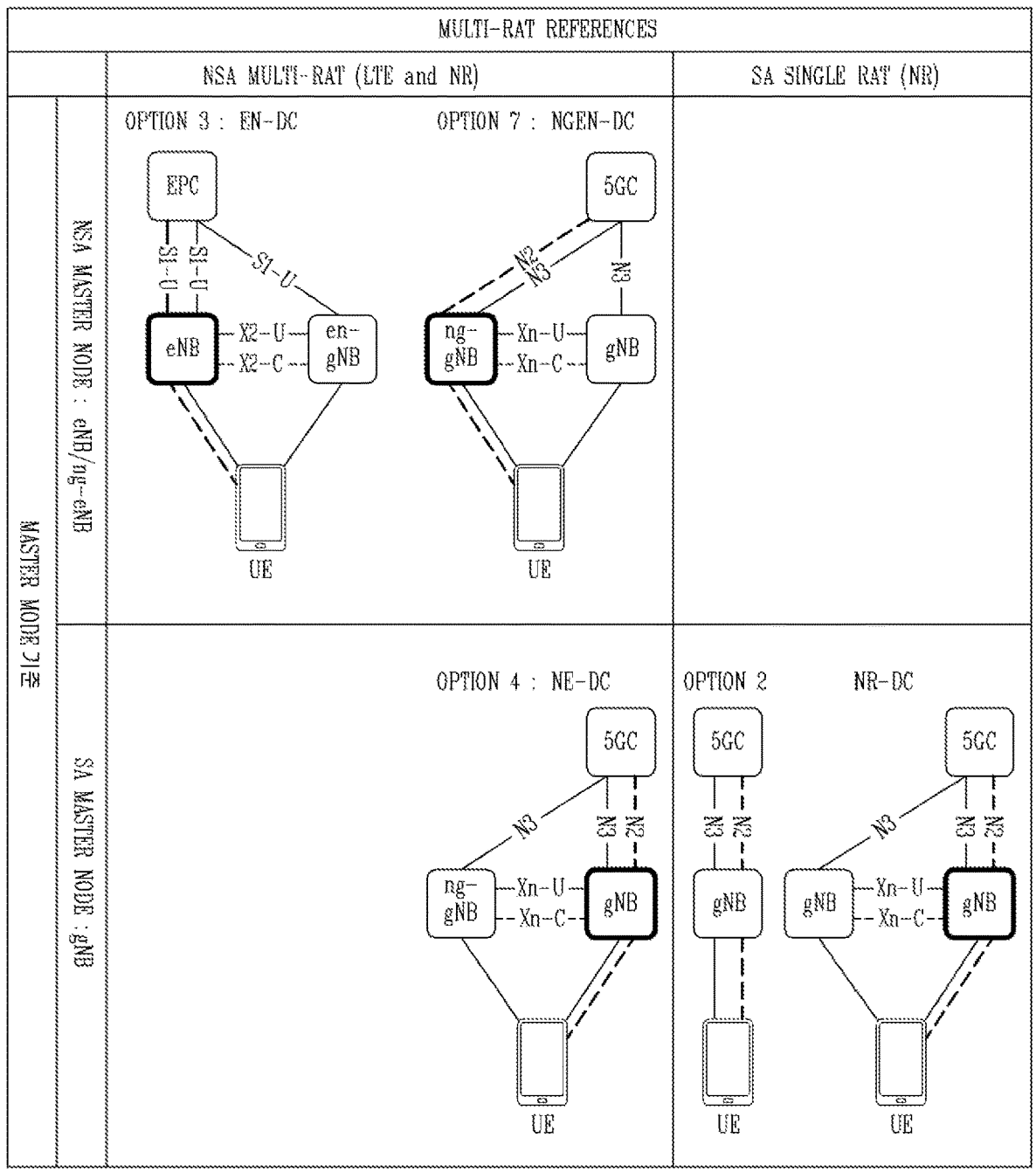
FIG. 9 is a conceptual view illustrating configurations in which an electronic device associated with the present disclosure interfaces with a plurality of base stations or network entities.

Referring to FIG. 9, 4G/5G deployment options are shown. With regard to 4G/5G deployment, when multi-RAT of 4G LTE and 5G NR is supported in a non-standalone (NSA) mode, it may be implemented as EN-DC in option 3 or NGEN-DC in option 5. On the other hand, when multi-RAT is supported in a standalone (SA) mode, it may be implemented as NE-DC in option 4. In addition, when single RAT is supported in a standalone (SA) mode, it may be implemented as NR-DC in option 2.

With regard to the base station type, the eNB is a 4G base station, which is also called an LTE eNB, and is based on the Rel-8-Rel-14 standard. On the other hand, ng-eNB is an eNB capable of interworking with a 5GC and gNB, which is also called an eLTE eNB, and is based on the Rel-15 standard. Furthermore, the gNB is a 5G base station interworking with a 5G NR and 5GC, which is also called an NR gNB, and is based on the Rel-15 standard. In addition, the en-gNB is a gNB capable of interworking with an EPC and an eNB, also called an NR gNB, and is based on the Rel-15 standard. With regard to the Dual Connectivity (DC) type, option 3 represents E-UTRA-NR Dual Connectivity (EN-DC). Option 7 represents NG-RAN E-UTRA-NR Dual Connectivity (NGEN-DC). Furthermore, option 4 represents NR-E-UTRA Dual Connectivity (NE-DC). Furthermore, option 2 represents NR-NR Dual Connectivity (NR-DC). In this regard, the technical features of double connection according to option 2 through option 7 are as follows.

Option 2: Independent 5G services may be provided with only a 5G system (5GC, gNB). In addition to enhanced Mobile Broadband (eMBB), Ultra-Reliable Low-Latency Communication (URLLC) and Massive Machine Type Communication (mMTC) may be possible, and 5GC features such as network slicing, MEC support, mobility on demand, and access-agnostic may be available to provide a full 5G service. Initially, due to coverage limitations, it may be used as a hot spot, an enterprise or overlay network, and when it is out of a 5G NR coverage, EPC-5GC interworking is required. A 5G NR full coverage may be provided, and dual connectivity (NR-DC) may be supported between gNBs using a plurality of 5G frequencies.

Option 3: This is a case where only a gNB is introduced into the existing LTE infrastructure. The core is an EPC and the gNB is an en-gNB that can interwork with the EPC and the eNB. The dual connectivity (EN-DC) is supported between the eNB and the en-gNB, and the master node is an eNB. An eNB, which is a control anchor of an en-gNB, processes control signaling for network access, connection configuration, handover, etc. of a UE, and user traffic may be transmitted through the eNB and/or the en-gNB. It is an option that is mainly applied to a first stage of 5G migration, as an operator operating an LTE nationwide network is able to quickly build a 5G network with the introduction of the en-gNB and minimal LTE upgrade without 5GC.

There are three types of option 3, which are options 3/3a/3x, depending on the user traffic split schemes. Bearer split is applied to options 3/3x, but is not applied to option 3a. The main scheme is option 3x.

Option 3: Only an eNB is connected to an EPC and an en-gNB is connected only to the eNB. User traffic may be split at a master node (eNB) and transmitted simultaneously to LTE and NR.

Option 3a: Both the eNB and the gNB are connected to the EPC, and thus user traffic is directly transferred from the EPC to the gNB. User traffic is transmitted to LTE or NR.

Option 3x: It is a combination of option 3 and option 3a, which differs from Option 3 in that user traffic is split at the secondary node (gNB).

The advantages of option 3 are i) that LTE can be used as a capacity booster for eMBB services, and ii) the terminal is always connected to LTE to provide service continuity through LTE even if it is out of 5G coverage or NR quality deteriorates so as to provide stable communication.

Option 4: 5GC is introduced, and still interworking with LTE, but independent 5G communication is possible. Core is 5GC, and the eNB is an ng-eNB capable of interworking with 5GC and a gNB. Dual connectivity (NE-DC) is supported between an ng-eNB and a gNB, and the master node is the gNB. LTE may be used as a capacity booster when 5G NR coverage is fully extended. There are two types of option 4, which are option 4/4a. The main scheme is option 4a.

Option 7: 5GC is introduced, and still interworking with LTE, and 5G communication relies on LTE. Core is 5GC, and the eNB is an ng-eNB capable of interworking with 5GC and a gNB. Dual connectivity (NGEN-DC) is supported between an ng-eNB and a gNB, and the master node is a gNB. 5GC features may be used, and when 5G coverage is insufficient yet, service continuity may be provided using an eNB as the master node similar to option 3. There are three types of option 7, which are options 7/7a/7x, depending on the user traffic split schemes. Bearer split is applied to options 7/7x, but is not applied to option 7a. The main scheme is option 7x.

Figure 10:
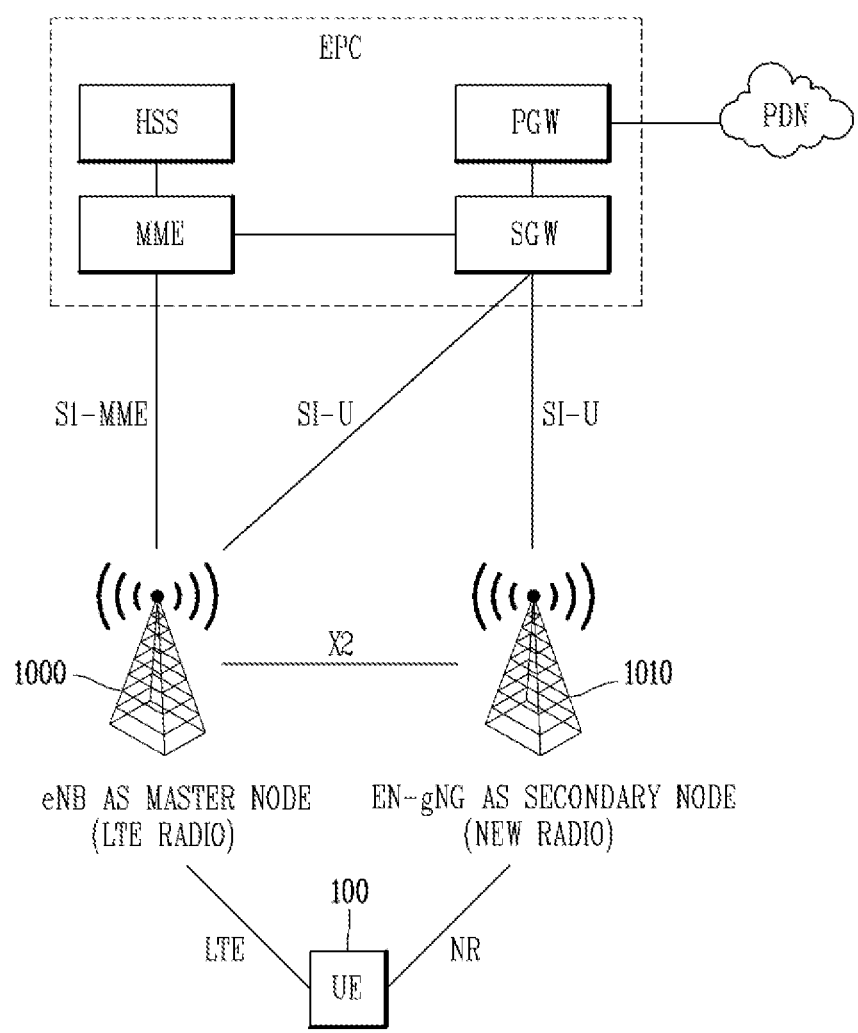
FIG. 10 is a conceptual view illustrating a system structure in which an electronic device associated with the present disclosure is connected to a plurality of different networks according to a Non-Stand Alone (NSA) structure.

Meanwhile, according to an NSA structure in association with MRDC (Multi RAT (Radio Access Technology) Dual Connectivity), an electronic device may be simultaneously connected to networks according to a plurality of different communication schemes to receive data from the connected networks. FIG. 10 illustrates an E-UTRA New Radio Dual Connectivity (EN-DC) structure in more detail as such an NSA structure.

Referring to FIG. 10, the electronic device 100 may be simultaneously connected to an eNB 1000 performing a function of a master node and an en-gNB 1010 serving as a secondary node.

Here, the eNB 1000 may generate an S1-MME control connection with MME that is a control entity of an EPC, which is a core of an LTE system. Furthermore, the S1-MME control connection may relay the transmission and reception of NAS control messages between the MME and the electronic device. In addition, the eNB 1000 may generate an RRC connection with the electronic device using LTE Radio technology, and manage an RRC state based on the connection.

Meanwhile, the en-gNB 1010 may not participate in the control connection and NAS message relay associated with the EPC, but may only participate in an additional data connection for transmitting and receiving data above a certain size.

On the other hand, the electronic device 100 may first attach to the EPC through the eNB 1000 for a dual connectivity (DC) connection. Furthermore, PDN (Packet Data Network) connection and bearers may be generated. When the PDN connection and the bearers are generated, the electronic device may be in an RRC connected state with the eNB 1000.

Then, the eNB 1000, which is a master node may determine the DC use of the electronic device in consideration of the current congestion state of the eNB 1000, the data transmission/reception status of the electronic device 100, and the presence of the en-gNB 1010 to act as a secondary node around the eNB 1000, the congestion state of the en-gNB 1010, and the like.

In addition, when the DC use is determined, the eNB 1000 may transmit and receive X2-C control messages to and from the en-gNB 1010 through an X2 interface. Furthermore, through the exchange of control messages, the eNB 1000 may execute a procedure of allowing part of bearers for serving data transmission and reception to the electronic device 100 to be served through the en-gNB 1010 using LTE radio resources controlled by the eNB 1000.

Therefore, part of bearers for serving data transmission and reception to the electronic device 100 may be transferred to the en-gNB 1010 using LTE radio resources, and the electronic device 100 may transmit and receive data using NR radio resources controlled by the en-gNB 1010 through the transferred part of bearers. Accordingly, the electronic device may be connected to both the eNB 1000 and the en-gNB 1010 to transmit and receive data through both LTE, that is, 4G radio resources and NR, that is, 5G radio resources.

Figure 11:
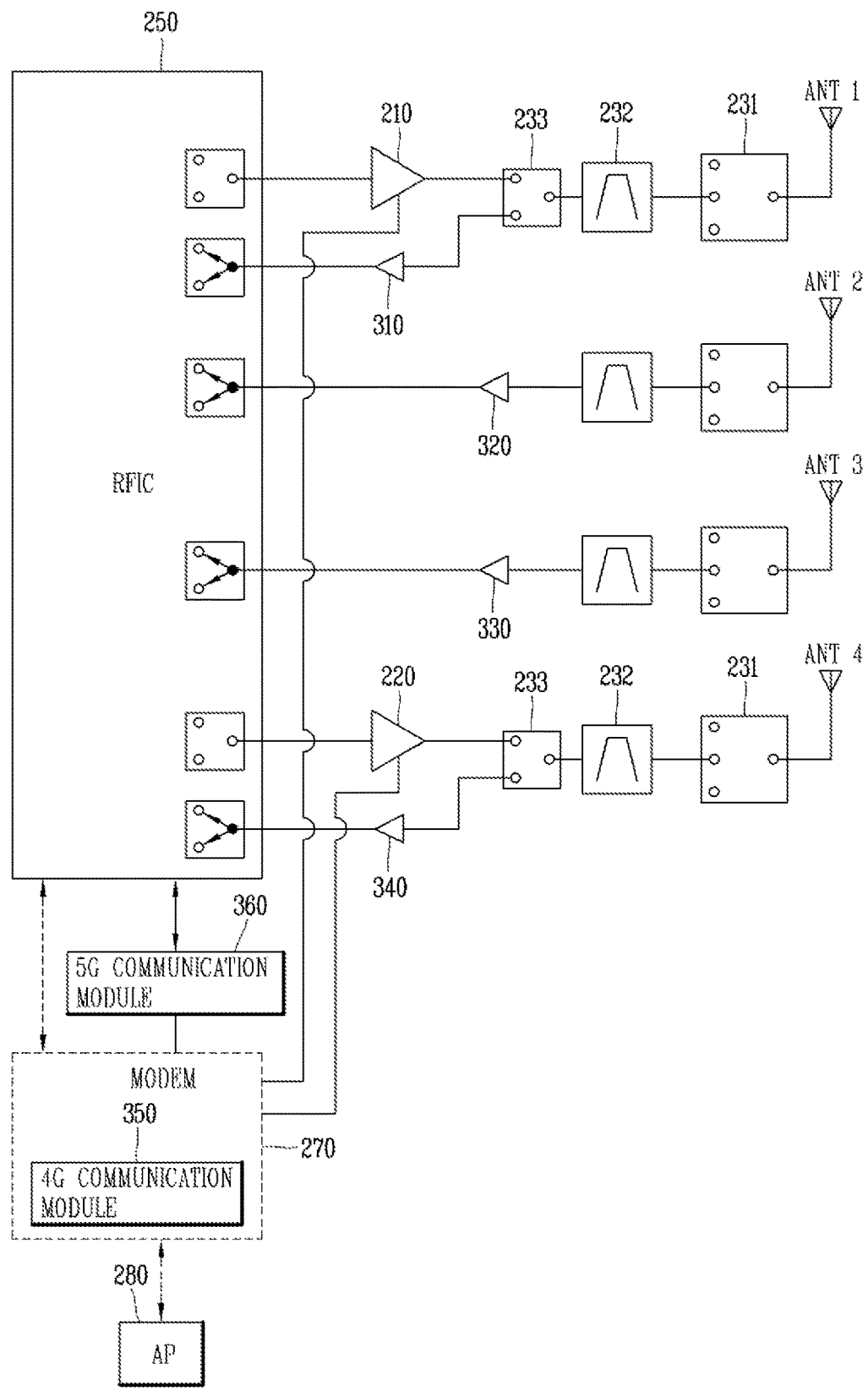
FIG. 11 is a structural diagram illustrating a structure of a wireless communication unit in which a modem controls the transmission power of a PA according to the maximum transmission power in an electronic device related to the present disclosure.

FIG. 11 is a structural diagram illustrating a structure of a wireless communication unit in which a modem controls the transmission power of a PA according to the maximum transmission power in an electronic device related to the present disclosure.

A wireless communication unit of an electronic device 100 according to an embodiment of the present disclosure may include a plurality of antennas and power amplifiers connected to the plurality of antennas, as shown in FIGS. 3B and 11. Here, the plurality of antennas may transmit and receive 4G signals and 5G signals and may be connected to the power amplifiers.

Meanwhile, the plurality of antennas may transmit and receive signals according to a specific communication scheme when the electronic device 100 is connected to only one network. On the other hand, when the electronic device 100 is simultaneously connected to different networks according to different communication schemes (dual connectivity), some of the plurality of antennas may transmit and receive signals according to a first communication scheme, and the others of the plurality of antennas may transmit and receive signals according to a second communication scheme.

In this case, the power amplifiers connected to the antennas that transmit and receive signals according to the first communication scheme may amplify the signals corresponding to the first communication scheme according to a first amplification gain set from a modem 270. Also, the power amplifiers connected to the antennas that transmit and receive signals according to the second communication scheme may amplify the signals corresponding to the second communication scheme according to a second amplification gain set from the modem 270. Here, the first amplification gain and the second amplification gain may be different.

Here, the first communication scheme may refer to a 4G communication scheme. Also, the second communication scheme may refer to a 5G communication scheme. Thus, the first network may refer to a 4G network, and a base station of the first network may refer to a 4G base station. Also, the second network may refer to a 5G network, and a base station of the second network may refer to a 5G base station.

Also, when the first base station is a master node, cells corresponding to the first communication scheme may be referred to as a master cell group (MCG). In this case, the second base station may be a secondary node, and cells corresponding to the second communication scheme may be referred to as a secondary cell group (SCG).

Meanwhile, for the sake of simplicity, FIG. 11 shows a 2T4R structure, but the present disclosure is not limited to this structure, and it will be appreciated that more power amplifiers or a greater number of communication systems may be provided depending on the application. However, for convenience of description, the following description assumes that multiplex communication is performed using two power amplifiers.

Referring to FIG. 11, the modem 270 may include a 5G communication module 360 that can operate in a 5G communication system and a 4G communication module 350 that can operate in a 4G communication system. Also, the 4G communication module 350 and the modem 270 may be physically separated or may be physically implemented on one chip and functionally separated.

Meanwhile, the modem 270 and the 4G communication module 350 may be electrically connected. Also, the 4G communication module 350 may perform modulation/demodulation for transmitting or receiving 4G signals according to the control of the modem 270.

First, the modem 270 may be connected to the 4G base station of the 4G network and may receive signals corresponding to the 4G communication scheme (4G signals) to the 4G network through the 4G base station or may receive the 4G signals from the 4G network.

In such a state, the modem 270 may control at least one of the power amplifiers 210 and 220 connected to the plurality of antennas that transmit 4G signals according to the radio propagation environment between the electronic device 100 and the 4G base station, to control the amplification gain of the transmitted 4G signals. Accordingly, the power strength of the uplink signal of the electronic device 100 may be changed.

As an example, the 4G base station may transmit transmit-power control (TPC) information on the basis of a signal received from the electronic device 100. The TPC information is information for regulating the power of the signal transmitted from the electronic device 100, and the 4G base station may determine the TPC information on the basis of the quality (packet quality) of the signal received from the electronic device 100, the result (power report) obtained by detecting the reception strength of the signal received from the electronic device 100, etc. and may transmit the detected TPC information to the electronic device 100. Then, the electronic device 100 may increase or decrease the amplification gain of the power amplifiers 210 and 220 on the basis of the received TPC information to increase or decrease the power of a signal transmitted from the electronic device 100 to the base station, that is, an uplink signal.

Meanwhile, unlike this, it will be appreciated that the electronic device 100 may increase or decrease the power of the uplink signal by itself.

For example, the modem 270 may measure the strength of a reference signal received from a base station. Also, the modem 270 may calculate the difference between the measured reception strength of the reference signal and the signal strength reference pre-received from the base station. Also, the modem 270 may detect a path loss corresponding to the radio propagation environment between the base station and the electronic device 100 on the basis of the calculated difference. Also, the modem 270 may increase or decrease the power of the uplink signal by itself according to the detected path loss.

Meanwhile, the modem 270 may control the 4G communication module 350 and the 5G communication module 360 to receive data through the 4G base station and the 5G base station according to a result of detecting the operational state of the electronic device 100 detected from an application processor (AP) 280. In this case, the modem 270 may activate the 5G communication module 360 while the 4G communication module 350 is activated.

The activated 5G communication module 360 may search the periphery of the electronic device 100 for a 5G base station (cell) that satisfies a predetermined condition. Also, the 5G base station may add the 5G base station (5G Cell ADD) and perform wireless communication and may provide service through the 5G network. Accordingly, the electronic device 100 may operate in a non-stand alone (NSA) scheme, which allows connection to both of the 4G network and the 5G network (dual connectivity (DC)).

When the electronic device is connected to the 4G network and the 5G network at the same time (dual connectivity), the modem 270 may control the first PA 210 and the second PA 220 to amplify signals according to different communication schemes. In this case, the amplification gains of the first PA 210 and the second PA 220 may be independently increased or decreased according to the radio propagation environment between the electronic device 100 and the 4G base station and the radio propagate environment between the electronic device 100 and the 5G base station. For example, assuming that the first PA 210 amplifies signals according to the 4G communication scheme and the second PA 220 amplifies signals according to the 5G communication scheme, the amplification gain of the first PA 210 may be controlled according to the radio propagation environment between the electronic device 100 and the 4G base station, and the amplification gain of the second PA 220 may be controlled according to the radio propagation environment between the electronic device 100 and the 5G base station. Thus, a signal transmitted to the 4G base station, that is, a 4G uplink signal and a signal transmitted to the 5G base station, that is, a 5G uplink signal may have different transmission power levels.

Meanwhile, when the electronic device 100 is connected to both of the 4G base station and the 5G base station through the dual connectivity, the modem 270 may determine the maximum transmission power corresponding to the dual connectivity on the basis of a power class corresponding to a combination of the frequency band of the 4G base station and the frequency band of the 5G base station. In this case, when the sum of the power of the 4G uplink signal and the power of the 5G uplink signal is greater than or equal to the maximum transmission power corresponding to the dual connectivity, the power of the 4G uplink signal and the power of the 5G uplink signal may be limited according to the maximum transmission power corresponding to the dual connectivity.

As an example, the modem 270 may limit at least one of the power of the 4G uplink signal and the power of the 5G uplink signal through a dynamic power sharing (DPS) function.

Meanwhile, for the dual connectivity, the electronic device 100 may be connected to a secondary node while connected to a master node, and both of the master network and the secondary network may be connected through the master node. Accordingly, when the connection to the master node fails, the connection to the secondary network also fails. Thus, the electronic device 100 may allocate the transmission power by placing more importance on the connection to the master node through the DPS function.

Meanwhile, as described above, the modem 270 may control the transmission power of uplink signals. That is, the modem 270 may control an uplink signal transmitted to a master cell group (MCG) (MCG uplink signal) according to the radio propagation environment between the electronic device 100 and the master node and may control the transmission power of an uplink signal transmitted to a secondary cell group (SCG) according to the radio propagation environment between the electronic device 100 and the secondary node.

Thus, when the radio propagation environment between the electronic device 100 and the master node is poor, the modem 270 may gradually increase the power of the MCG uplink signal. The increased power of the MCG uplink signal may increase over the maximum transmission power corresponding to the dual connectivity.

Meanwhile, the electronic device 100 may transmit signals (uplink signals) to the MCG and the SCG or receive signals (downlink signals) from the MCG and the SCG according to a predetermined schedule. As an example, in the 4G communication scheme or the 5G communication scheme, the downlink signals and the uplink signals may be transmitted or received through the time division duplex (TDD) scheme or the frequency division duplex (FDD) scheme.

Figure 12:
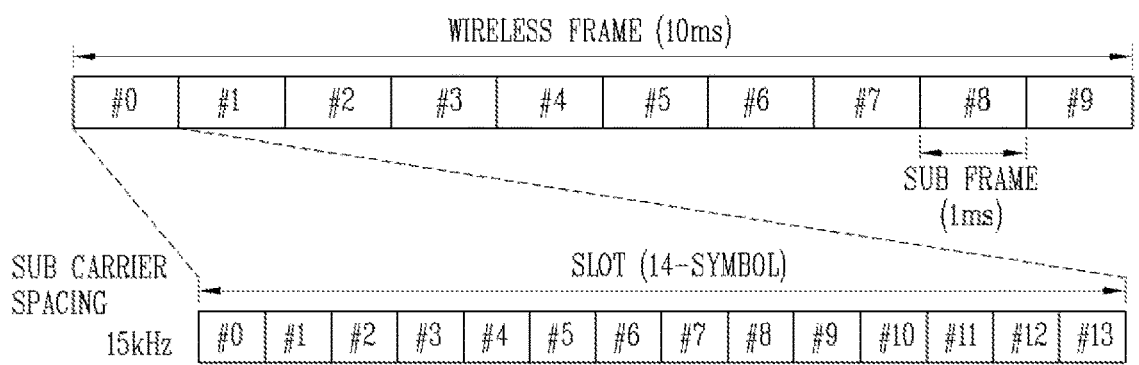
FIG. 12 includes exemplary diagrams showing examples slots in which data is transmitted in the time domain according to the FDD scheme and uplink/downlink schedules according to the TDD scheme.
Figure 12:
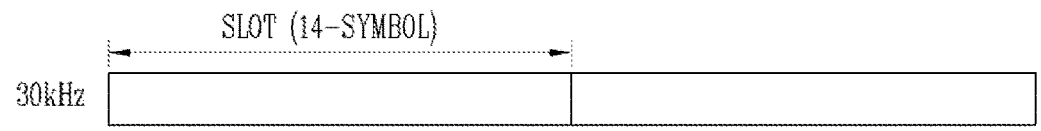
Figure 12:
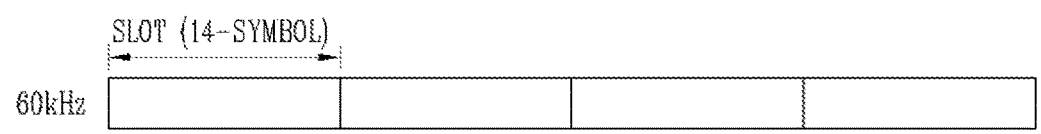
Figure 12:
Figure 12:
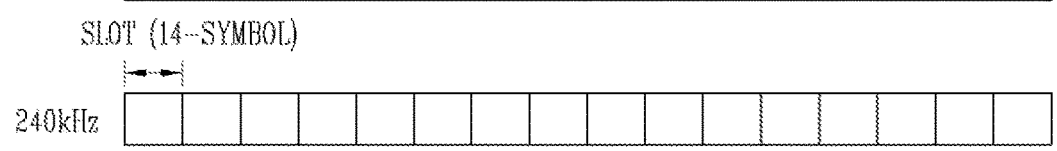

FIG. 12 below shows uplink/downlink schedules corresponding to the TDD scheme (FIG. 12A) and examples of slots in which data is transmitted and received in the time domain according to the FDD scheme (FIG. 12B).

Here, the TDD scheme is a scheme in which a downlink signal and an uplink signal can be transmitted or received in a time-division manner in the same frequency band (frequency domain), and the FDD scheme is a scheme in which a downlink signal and an uplink signal can be transmitted or received through different frequencies according to time managed by a network.

Therefore, when the transmission timing of uplink signals according to the 4G communication scheme matches the transmission timing of uplink signals according to the 5G communication scheme, available transmission power may be preferentially allocated to the transmission of the MCG uplink signal. Then, the transmission of the SCG uplink signal may be restricted. In this case, when the radio propagation environment between the electronic device 100 and the master node is poor, the increased power of MCG uplink signals may be greater than or equal to the maximum transmission power corresponding to the dual connectivity. At this time, all available transmission power is used to transmit MCG uplink signals, and thus the transmission of SCG uplink signals may be stopped.

Meanwhile, when the SCG uplink signal is not received for more than a preset time while the dual connection is made, the secondary node may determine that it is difficult for the electronic device 100 to communicate through the secondary network. Then, the secondary node may cancel the connection to the electronic device 100 in order to save resources. In this case, the electronic device 100 may fail in the connection to the secondary network although the electronic device 100 is connected to both of the master network and the secondary network.

Therefore, when a state in which an uplink signal is output by the electronic device 100 satisfies a preset condition and the state is maintained for a preset time, the modem 270 of the electronic device 100 according to an embodiment of the present disclosure may stop the transmission of the MCG uplink signal for a certain time and transmit the SCG uplink signal while the transmission of the MCG uplink signal is stopped. Also, after the certain time, the modem 270 may stop the transmission of the SCG uplink signal and resume the transmission of the MCG uplink signal.

Meanwhile, when the time during which the transmission of the MCG uplink signal is stopped is only less than a preset time (e.g., 1 ms), the master node that has received the MCG uplink signal may determine that a temporary failure has occurred. Then, the master node may request the retransmission of packets corresponding to a time slot in which the transmission of the MCG uplink signal is stopped, and the modem 270 may prevent an error due to packet loss by transmitting the packets of which the retransmission is requested. Meanwhile, since signal transmission for two sub-frames is possible for 1 ms, a feedback signal (an ACK signal) indicating that the electronic device 100 is connected to the secondary network may be sufficiently transmitted. Therefore, when the SCG uplink signal is transmitted, the secondary node may identify that the electronic device 100 is connected to the secondary network and thus may maintain the connection to the electronic device 100.

Meanwhile, in the following description, the detailed operations of the electronic device 100 according to the embodiment of the present disclosure described with reference to FIG. 11 will be described in more detail with reference to a flowchart.

Figure 13:
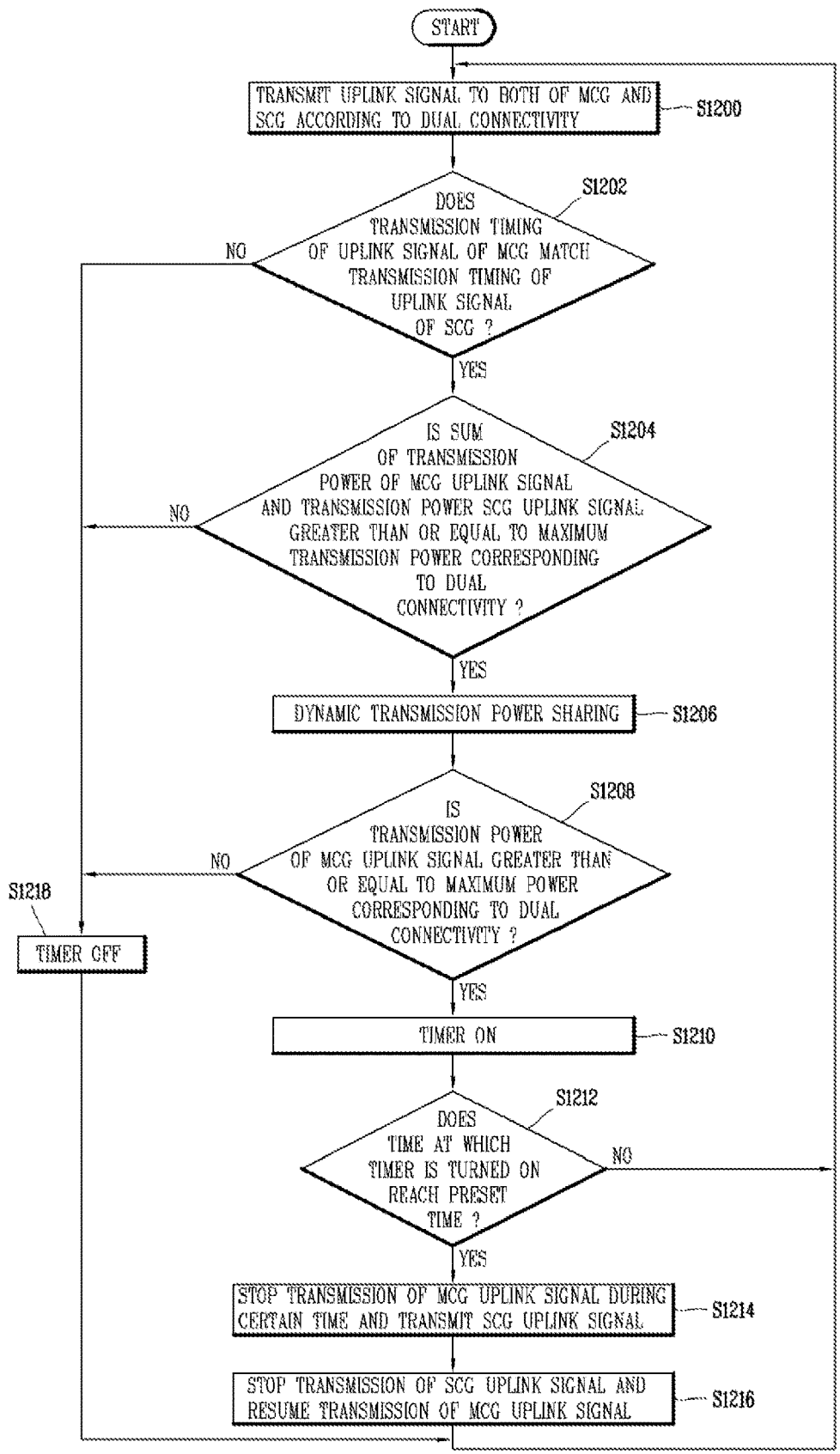
FIG. 13 is a flowchart illustrating an operational process of transmitting an uplink signal when the transmission of an SCG uplink signal is restricted according to transmission power required by MCG in an electronic device related to the present disclosure.

Referring to FIG. 13, the modem 270 of the electronic device 100 according to an embodiment of the present disclosure may transmit uplink signals (MCG uplink signal and SCG uplink signal) to both of a master cell group (hereinafter referred to as an MCG) and a secondary cell group (hereinafter referred to as an SCG) according to dual connectivity to a master network and a secondary network (S1200).

In this case, the transmission power of the MCG uplink signal and the transmission power of the SCG uplink signal may be regulated according to the radio propagation environment between a master node and the electronic device 100 and the radio propagation environment between a secondary node and the electronic device 100. To this end, as shown in FIG. 11, the modem 270 may control at least one power amplifier that amplifies the MCG uplink signal and at least one power amplifier that amplifies the SCG uplink signal to have different amplification gains.

In this state, the modem 270 may determine whether the transmission timing of the MCG uplink signal matches the transmission timing of the SCG uplink signal (S1202). Also, when the transmission timing of the MCG uplink signal matches the transmission timing of the SCG uplink signal, the modem 270 may calculate the sum of the transmission power of the MCG uplink signal and the sum of the transmission power of the SCG uplink signal. Also, the modem 270 may detect whether the calculated sum of the transmission power is greater than or equal to the maximum transmission power determined due to the dual connectivity of the master network and the secondary network (S1204).

Meanwhile, when the determination result of S1204 is that the calculated sum of the transmission power is greater than or equal to the maximum transmission power determined according to the dual connectivity, the modem 270 may limit the transmission power of at least one uplink signal through the DPS function (S1206). For example, in the case of operation S1206, the connection to the master node is prioritized. Thus, the transmission power of the MCG uplink signal may be maintained, and the transmission power of the SCG uplink signal may be attenuated.

Meanwhile, when the transmission power of the MCG uplink signal and the transmission power of the SCG uplink signal are regulated through the DPS function of operation S1206, the modem 270 may detect whether the transmission power of one MCG uplink signal is greater than or equal to the maximum transmission power corresponding to the dual connectivity (S1208). Also, when the detection result of operation S1208 is that the transmission power of one MCG uplink signal is greater than or equal to the maximum transmission power corresponding to the dual connectivity, the modem 270 may switch the operation state of a timer into an on state (S1210). The timer may be implemented inside the modem 270 in the form of software or an application or as a separate module.

Here, the timer may perform a time counting operation when the timer is switched on. That is, the timer may be switched on only when the transmission timing of the MCG uplink signal matches the transmission timing of the SCG uplink signal in operation S1202, the sum of the transmission power of the MCG uplink signal and the sum of the transmission power of the SCG uplink signal are greater than or equal to the maximum transmission power determined according to the dual connectivity in operation S1204, and the transmission power of one MCG uplink signal is greater than or equal to the maximum transmission power corresponding to the dual connectivity in operation S1208.

On the other hand, when one of operation S1202, operation S1204, and operation S1208 is not satisfied, that is, when the transmission timing of the MCG uplink signal does not match the transmission timing of the SCG uplink signal, when the sum of the transmission power of the MCG uplink signal and the sum of the transmission power of the SCG uplink signal are less than the maximum transmission power determined according to the dual connectivity, or when the transmission power of one MCG uplink signal is less than the maximum transmission power corresponding to the dual connectivity, the modem 270 may switch the operation state of the timer into an off state (S1218). In this case, when the timer is switched off, the timer may stop an operation of initializing the measured time and counting time.

On the other hand, when the timer is switched on in operation S1210, the modem 270 may detect whether the switching-on time of the timer has reached a preset time (S1212). In this case, the timer starts the time counting when the timer is switched on, and thus the time counted by the timer may be a time during which the timer remains turned on. Accordingly, operation S1212 may be a process of comparing the time counted by the timer to the preset time.

When the detection result of operation S1212 is that the switching-on time of the timer does not reach the preset time, it may be determined that the transmission restriction of the SCG uplink is temporary. Therefore, the processing proceeds back to operation S1200, and the modem 270 may transmit the MCG uplink signal and the SCG uplink signal. Also, the process from operation S1202 to operation S1208 may be performed again.

In this case, the processing proceeds to operation S1218, and the modem 270 may switch the timer off when the detection result of operation S1202 is that the transmission timing of the MCG uplink signal does not match the transmission timing of the SCG uplink signal, when the sum of the transmission power of the MCG uplink signal and the sum of the transmission power of the SCG uplink signal are less than the maximum transmission power determined according to the dual connectivity in operation S1204, or when the transmission power of one MCG uplink signal is less than the maximum transmission power corresponding to the dual connectivity in operation S1208. In this case, when the timer is already turned off, the modem 270 may keep the timer off.

However, when all the conditions of operation S1202, operation S1204, and operation S1208 are satisfied, that is, when the transmission timing of the MCG uplink signal matches the transmission timing of the SCG uplink signal (operation S1202), when the sum of the transmission power of the MCG uplink signal and the sum of the transmission power of the SCG uplink signal are greater than or equal to the maximum transmission power determined according to the dual connectivity (operation S1204), and when the transmission power of one MCG uplink signal is greater than or equal to the maximum transmission power corresponding to the dual connectivity (operation S1208), the processing proceeds to operation S1210, and the modem 270 may switch the timer on. In this case, when the timer is already turned on, the modem 270 may keep the timer on.

On the other hand, when the detection result of operation S1212 is that the time counted by the timer that is switched on reaches the preset time, the modem 270 may stop the transmission of the MCG uplink signal for a certain time. Also, while the transmission of the MCG uplink signal is stopped, the modem 270 may transmit the SCG uplink signal (S1214).

Here, the certain time may be a time during which the master node may determine that the MCG uplink signal has not been received due to a temporary failure. For example, the certain time may be a time of 1 ms or less and may be a time during which packets corresponding to two subframes may be transmitted. In this case, for 1 ms, the modem 270 may transmit control plane data to the secondary node. As an example, the modem 270 may transmit physical uplink control channel (PUCCH) information to the secondary node for the certain time. The PUCCH information may be response (ACK) information to the secondary node, that is, feedback information. When the PUCCH information is received, the secondary node may maintain connection between the electronic device 100 and the secondary node.

Meanwhile, after the certain time, the modem 270 may stop the transmission of the SCG uplink signal and restarts the transmission of the MCG uplink signal (S1216). In this case, the certain time is an extremely short time that can be determined as a temporary failure, the master node may determine that packets not transmitted during the corresponding time are not received due to the temporary failure. Therefore, the master node may request the retransmission of the corresponding packets, and the modem 270 may prevent an error due to packet loss by transmitting the packets corresponding to the retransmission request to the master node.

Meanwhile, the preset time in operation S1212 may be a time shorter than a time interval corresponding to a feedback period for the secondary node to check whether the electronic device 100 is connected. When the preset time in operation S1212 is set to a time longer than the feedback period, the connection between the secondary node and the electronic device 100 may fail before the SCG uplink signal is transmitted in operation S1214.

Meanwhile, when the SCG uplink signal is transmitted for the certain time in operation S1214, the modem 270 may switch the timer off to initialize the timer. Also, the processing proceeds to operation S1216, and the modem 270 may stop the transmission of the SCG uplink signal and resume the transmission of the MCG uplink signal. Then, the processing proceeds back to operation S1200, and the modem 270 may perform the above processes.

Further scope of applicability of the present disclosure will become apparent from the following detailed description. It should be understood, however, that the detailed description and specific examples, such as the preferred implementation of the invention, are given by way of illustration only, since various changes and modifications within the spirit and scope of the invention will be apparent to those skilled in the art.

With regard to the present disclosure described above, a design of an antenna including the processor 180 and a controller for controlling the same in the electronic device 100 having a plurality of antennas and a control method thereof may be implemented as codes readable by a computer on a medium written by a program. The computer-readable medium may include all types of recording devices each storing data readable by a computer system. Examples of such computer-readable media may include hard disk drive (HDD), solid state disk (SSD), silicon disk drive (SDD), ROM, RAM, CD-ROM, magnetic tape, floppy disk, optical data storage element and the like. Also, the computer-readable medium may also be implemented as a format of carrier wave (e.g., transmission via an Internet). The computer may include the processor 180 of the electronic device. Therefore, the detailed description should not be limitedly construed in all of the aspects, and should be understood to be illustrative. Therefore, all changes and modifications that fall within the metes and bounds of the claims, or equivalents of such metes and bounds are therefore intended to be embraced by the appended claims.

What is claimed is:

1. An electronic device comprising:
   a plurality of antennas comprising at least one first antenna configured to transmit or receive signals according to a first communication scheme and at least one second antenna configured to transmit or receive signals according to a second communication scheme;
   a plurality of power amplifiers connected to the plurality of antennas; and
   a modem configured to, when the electronic device is simultaneously connected to a master cell group (MCG) corresponding to the first communication scheme and a secondary cell group (SCG) corresponding to the second communication scheme, control the plurality of power amplifiers such that transmission of a second uplink signal to be transmitted to the SCG is suspended when a transmission power of a first uplink signal transmitted to the MCG is greater than or equal to a preset maximum transmission power and configured to, when the transmission of the second uplink signal is suspended for a preset time, stop the transmission of the first uplink signal for a certain time, transmit the second uplink signal, and maintain connection to the SCG even when the transmission of the second uplink signal is suspended, and
   wherein the modem determines whether a difference between a sum of the transmission power of the first uplink signal and the transmission power of the second uplink signal and the preset maximum transmission power is less than or equal to a certain level, and
   when the transmission power of the first uplink signal is greater than or equal to the preset maximum transmission power while the sum of the transmission power of the first uplink signal and the transmission power of the second uplink signal is greater than or equal to the preset maximum transmission power, the modem suspends the transmission of the second uplink signal.

2. The electronic device of claim 1, wherein
   the preset maximum transmission power is maximum transmission power that is set when the electronic device is simultaneously connected to the MCG and the SCG, and
   the preset maximum transmission power is determined based on a power class corresponding to a combination of a frequency band of a base station according to the MCG connected to the electronic device and a frequency band of a base station according to the SCG connected to the electronic device.

3. The electronic device of claim 1, wherein the preset time is a time shorter than a time interval corresponding to a feedback period of the SCG.

4. The electronic device of claim 1, wherein
   the certain time is a time corresponding to a preset number of subframes, and
   the modem transmits data corresponding to a control plane for the certain time as the second uplink signal.

5. The electronic device of claim 4, wherein the certain time is a time corresponding to a time length in which two subframes are transmitted.

6. The electronic device of claim 1, wherein the MCG is a cell group which corresponds to a 4G communication scheme, and the SCG is a cell group in which signals corresponding to a 5G communication scheme are exchanged.

7. The electronic device of claim 1, wherein when the transmission timing of the first uplink signal and the transmission timing of the second uplink signal overlap, the modem determines whether the difference between the sum of the transmission power of the first uplink signal and the transmission power of the second uplink signal and the preset maximum transmission power is less than or equal to the certain level.

8. A control method of an electronic device, the control method comprising:
- a first operation of, when the electronic device is simultaneously connected to a master cell group (MCG) corresponding to a first communication scheme and a secondary cell group (SCG) corresponding to a second communication scheme, detecting whether a transmission power of a first uplink signal transmitted to the MCG is greater than or equal to a preset maximum transmission power;
- a second operation of, when the detection result of the first operation is that the transmission power of the first uplink signal is greater than or equal to the preset maximum transmission power, stopping the transmission of a second uplink signal to be transmitted to the SCG;
- a third operation of counting time during which the transmission of the second uplink signal is suspended;
- a fourth operation of, when the time during which the transmission of the second uplink signal is suspended reaches a preset time, stopping the transmission of the first uplink signal for a certain time;
- a fifth operation of transmitting the second uplink signal for the certain time during which the transmission of the first uplink signal is stopped; and
- a sixth operation of, after the certain time, stopping the transmission of the second uplink signal and then resuming the transmission of the first uplink signal, and wherein the second operation comprises:
- a second_1 operation of determining whether a difference between a sum of the transmission power of the first uplink signal and the transmission power of the second uplink signal and the preset maximum transmission power is less than or equal to a certain level; and
- a second_2 operation of suspending the transmission of the second uplink signal, when the transmission power of the first uplink signal is greater than or equal to the preset maximum transmission power while the sum of the transmission power of the first uplink signal and the transmission power of the second uplink signal is greater than or equal to the preset maximum transmission power.

9. The control method of claim 8, wherein the second_1 operation further comprises:
- a second_0 operation of detecting whether the transmission timing of the first uplink signal and the transmission timing of the second uplink signal overlap, preceding the second_1 operation.

10. The control method of claim 8, wherein the preset time is a time shorter than a time interval corresponding to a feedback period of the SCG.

11. The control method of claim 8, wherein
the certain time is a time corresponding to a preset number of subframes, and
the fifth operation is an operation of transmitting data corresponding to a control plane for the certain time as the second uplink signal.

* * * * *